United States Patent
Kuzmin et al.

(10) Patent No.: US 12,072,520 B2
(45) Date of Patent: Aug. 27, 2024

(54) LINEAR POLARIZERS AND METHODS OF FORMING A LINEAR POLARIZER

(71) Applicant: LIGHT POLYMERS HOLDING, Grand Cayman (KY)

(72) Inventors: Valeriy Kuzmin, Castro Valley, CA (US); Evgeny Morozov, Burlingame, CA (US)

(73) Assignee: LIGHT POLYMERS HOLDING, Grand Cayman (KY)

(*) Notice: Subject to any disclaimer, the term of this patent is extended or adjusted under 35 U.S.C. 154(b) by 0 days.

(21) Appl. No.: 17/980,205

(22) Filed: Nov. 3, 2022

(65) Prior Publication Data
US 2023/0145287 A1    May 11, 2023

Related U.S. Application Data

(60) Provisional application No. 63/278,308, filed on Nov. 11, 2021.

(51) Int. Cl.
*G02B 5/30* (2006.01)

(52) U.S. Cl.
CPC ......... *G02B 5/3083* (2013.01); *G02B 5/3016* (2013.01)

(58) Field of Classification Search
CPC ...... G02B 5/3083; G02B 5/3016; G02B 5/30; G02F 1/133528
See application file for complete search history.

(56) References Cited

U.S. PATENT DOCUMENTS

| | | | |
|---|---|---|---|
| 3,208,814 A | 9/1965 | Sievenpiper et al. |
| 4,278,578 A | 7/1981 | Carpenter |
| 4,605,698 A | 8/1986 | Briden |
| 5,067,797 A | 11/1991 | Yokokura et al. |
| 5,739,296 A | 4/1998 | Gvon et al. |
| 5,863,113 A | 1/1999 | Oe et al. |

(Continued)

FOREIGN PATENT DOCUMENTS

| | | |
|---|---|---|
| EP | 0489951 | 6/1992 |
| JP | 06235917 | 8/1994 |

(Continued)

OTHER PUBLICATIONS

Gribkova "Chemical synthesis of polyaniline in the presence of poly(amidosulfonic acids) with different rigidity of the polymer chain," Apr. 2011, *Polymer* 52(12): 2474-2484.

(Continued)

*Primary Examiner* — Mariam Qureshi
(74) *Attorney, Agent, or Firm* — MUETING RAASCH GROUP

(57) ABSTRACT

A linear polarizer layer includes a birefringent aromatic polymer, one or more cationic dyes, and optionally multivalent cations and optionally iodide anions. Methods of making linear polarizer layer where the linear polarizer layer includes a birefringent aromatic polymer, a cationic dye, and optionally a plurality of iodine ions and optionally a plurality of multivalent cations. Methods of making linear polarizer layer where the linear polarizer layer includes a birefringent aromatic polymer, one or more cationic dyes, iodide anions, and optionally a plurality of multivalent cations. Optical articles that include a linear polarizer layer of the present disclosure.

17 Claims, 17 Drawing Sheets

(56) References Cited

U.S. PATENT DOCUMENTS

| | | | |
|---|---|---|---|
| 6,002,829 A | 12/1999 | Winston et al. |
| 6,045,894 A | 4/2000 | Jonza et al. |
| 6,049,428 A | 4/2000 | Khan et al. |
| 6,144,424 A | 11/2000 | Okuda et al. |
| 6,174,394 B1 | 1/2001 | Gvon et al. |
| 6,322,236 B1 | 11/2001 | Campbell et al. |
| 6,399,166 B1 | 6/2002 | Khan et al. |
| 6,481,864 B2 | 11/2002 | Hosseini et al. |
| 6,563,640 B1 | 5/2003 | Ignatov et al. |
| 6,583,284 B1 | 6/2003 | Sidorenko et al. |
| 6,619,553 B1 | 9/2003 | Bobrov et al. |
| 6,734,936 B1 | 5/2004 | Schadt et al. |
| 6,841,320 B2 | 1/2005 | Lazarev et al. |
| 6,846,522 B1 | 1/2005 | Bobrov et al. |
| 6,847,420 B2 | 1/2005 | Lazarev et al. |
| 6,848,897 B2 | 2/2005 | Lazarev et al. |
| 6,876,806 B2 | 4/2005 | Lazarev et al. |
| 6,913,783 B2 | 7/2005 | Lazarev et al. |
| 6,942,925 B1 | 9/2005 | Lazarev et al. |
| 6,962,734 B2 | 11/2005 | Nazarov et al. |
| 7,015,990 B2 | 3/2006 | Yeh et al. |
| 7,025,900 B2 | 4/2006 | Sidorenko et al. |
| 7,026,019 B2 | 4/2006 | Dutova et al. |
| 7,031,053 B2 | 4/2006 | Bobrov et al. |
| 7,042,612 B2 | 5/2006 | Lazarev et al. |
| 7,045,177 B2 | 5/2006 | Dutova et al. |
| 7,053,970 B2 | 5/2006 | Lazarev |
| 7,084,939 B2 | 8/2006 | Paukshto et al. |
| 7,092,163 B2 | 8/2006 | Bastawros et al. |
| 7,106,398 B2 | 9/2006 | Bobrov |
| 7,108,749 B2 | 9/2006 | Bobrov |
| 7,110,177 B2 | 9/2006 | Sugino et al. |
| 7,113,337 B2 | 9/2006 | Lazarev et al. |
| 7,132,138 B2 | 11/2006 | Lazarev |
| 7,144,608 B2 | 12/2006 | Paukshto et al. |
| 7,160,485 B2 | 1/2007 | Nazarov et al. |
| 7,166,161 B2 | 1/2007 | Lazarev et al. |
| 7,190,416 B2 | 3/2007 | Paukshto et al. |
| 7,204,938 B2 | 4/2007 | Lazarev |
| 7,211,824 B2 | 5/2007 | Lazarev |
| 7,267,849 B2 | 9/2007 | Lazarev et al. |
| 7,271,863 B2 | 9/2007 | Paukshto et al. |
| 7,291,223 B2 | 11/2007 | Lazarev |
| 7,297,209 B2 | 11/2007 | Lazarev et al. |
| 7,315,338 B2 | 1/2008 | Yeh et al. |
| 7,317,499 B2 | 1/2008 | Paukshto et al. |
| 7,324,181 B2 | 1/2008 | Lazarev et al. |
| 7,405,787 B2 | 7/2008 | Paukshto et al. |
| 7,450,194 B2 | 11/2008 | Lazarev |
| 7,456,915 B2 | 11/2008 | Lazarev et al. |
| 7,479,311 B2 | 1/2009 | Bobrov |
| 7,480,021 B2 | 1/2009 | Rao et al. |
| 7,554,636 B2 | 6/2009 | Nakatsugawa |
| 7,557,876 B2 | 7/2009 | Lazarev et al. |
| 7,651,738 B2 | 1/2010 | Grodsky et al. |
| 7,660,047 B1 | 2/2010 | Travis et al. |
| 7,733,443 B2 | 6/2010 | Lazarev et al. |
| 7,850,868 B2 | 12/2010 | Matsuda et al. |
| 7,888,505 B2 | 2/2011 | Doutova et al. |
| 7,889,297 B2 | 2/2011 | Palto |
| 7,911,557 B2 | 3/2011 | Lazarev et al. |
| 7,969,531 B1 | 6/2011 | Li et al. |
| 8,081,270 B2 | 12/2011 | Lazarev |
| 8,142,863 B2 | 3/2012 | Palto |
| 8,168,082 B2 | 5/2012 | Matsuda et al. |
| 8,189,165 B2 | 5/2012 | Umemoto et al. |
| 8,257,802 B2 | 9/2012 | Inoue et al. |
| 8,268,937 B2 | 9/2012 | Bos et al. |
| 8,305,350 B2 | 11/2012 | Chang |
| 8,404,066 B2 | 3/2013 | Goto et al. |
| 8,416,376 B2 | 4/2013 | Palto |
| 8,512,824 B2 | 8/2013 | Kasianova et al. |
| 8,551,357 B2 | 10/2013 | Miyazaki et al. |
| 2003/0179363 A1 | 9/2003 | Wang |
| 2004/0126712 A1* | 7/2004 | Kawamura ............ G03F 7/165 |
| | | 430/324 |
| 2007/0064417 A1 | 3/2007 | Hatanaka et al. |
| 2007/0110378 A1 | 5/2007 | Zarian |
| 2007/0279934 A1 | 12/2007 | Kim et al. |
| 2007/0285599 A1 | 12/2007 | Oxude |
| 2008/0042154 A1 | 2/2008 | Wano |
| 2008/0074595 A1 | 3/2008 | Nakatsugawa |
| 2008/0298067 A1 | 12/2008 | Chu |
| 2008/0304283 A1 | 12/2008 | Parker et al. |
| 2009/0269591 A1 | 10/2009 | Kasianova et al. |
| 2010/0039705 A1 | 2/2010 | Doutova et al. |
| 2010/0085521 A1 | 4/2010 | Kasianova et al. |
| 2010/0149471 A1 | 6/2010 | Palto |
| 2010/0190015 A1 | 7/2010 | Kasianova |
| 2010/0215954 A1 | 8/2010 | Kuzmin et al. |
| 2011/0149206 A1 | 6/2011 | Lazarev |
| 2011/0149393 A1 | 6/2011 | Nokel et al. |
| 2011/0182084 A1 | 7/2011 | Tomlinson et al. |
| 2011/0255305 A1 | 10/2011 | Chen et al. |
| 2012/0013982 A1 | 1/2012 | Kharatiyan |
| 2012/0081784 A1 | 4/2012 | Lazarev |
| 2012/0099052 A1 | 4/2012 | Lazarev |
| 2012/0113380 A1 | 5/2012 | Geivandov et al. |
| 2012/0113678 A1 | 5/2012 | Cornelissen et al. |
| 2012/0113680 A1 | 5/2012 | Nakai et al. |
| 2012/0244330 A1 | 9/2012 | Sun |
| 2013/0003178 A1 | 1/2013 | Lazarev |
| 2013/0011642 A1 | 1/2013 | Sun |
| 2013/0070480 A1 | 3/2013 | Griffin et al. |
| 2013/0251947 A1 | 9/2013 | Lazarev |
| 2014/0133177 A1 | 5/2014 | Miller et al. |
| 2014/0140091 A1 | 5/2014 | Vasylyev |
| 2014/0186637 A1 | 7/2014 | Kasianova et al. |
| 2014/0320961 A1 | 10/2014 | Lazarev |
| 2014/0322452 A1 | 10/2014 | Kasyanova et al. |
| 2014/0350214 A1 | 11/2014 | Kharatiyan |
| 2015/0086799 A1 | 3/2015 | Kasyanova et al. |
| 2015/0123911 A1 | 5/2015 | Poliakov et al. |
| 2015/0266999 A1 | 9/2015 | Kuzmin et al. |
| 2020/0110209 A1* | 4/2020 | Huang ............... B29D 11/0073 |

FOREIGN PATENT DOCUMENTS

| | | |
|---|---|---|
| JP | 2010-091984 A | 4/2010 |
| WO | WO 2010-064194 A1 | 6/2010 |
| WO | WO 2012-007923 A1 | 1/2012 |
| WO | WO 2013-119922 A1 | 8/2013 |
| WO | WO 2014/174381 | 10/2014 |

OTHER PUBLICATIONS

Kasianova, "New Transparent Birefringent Material for Interference Polarizer Fabrication" 2006 *XV International Symposium Advanced Display Technologies (ADT'06)*, Moscow, Russia, 1-6.

Konoshchuk, "Physicochemical Properties of Chemically and Mechanochemically Prepared Interpolymer Complexes of Poly(3,4-Ethylenedioxythiophene) with Polyamidosulfonate Dopants," Jan. 2014, *Theoretical and Experimental Chemistry* 50(1): 21-28 (Russian Original, Jan. 2014).

Koo et al., "Preparation and humidity-sensitive properties of novel photocurable sulfonated polyimides," *Macromolecular Research*, Dec. 1, 2012, 20(12):1226-1233.

Li, "Design Optimization of Reflective Polarizers for LCD Backlight Recycling" Aug. 2009 *J Display Tech.*, 56(8): 335-340.

* cited by examiner

US 12,072,520 B2

LINEAR POLARIZERS AND METHODS OF FORMING A LINEAR POLARIZER

BACKGROUND

Poly(vinyl alcohol) (PVA) films are doped with iodine and subsequently stretched uniaxially to obtain dichroic polarizers in which the absorption of visible light is maximum along the stretch direction and minimum perpendicular to the stretch direction. These PVA-iodine polarizers are used widely in liquid crystal displays (LCDs). However, this conventional technology has limitations. One limitation is that PVA-iodine polarizer requires stretching. Another limitation is that a typical PVA-iodine polarizer film is 60~80 micrometers (μm) thick. Another limitation is that iodine in the film is not strongly bound to PVA which causes the optical characteristics to become sensitive to the environment. Therefore, what is desired is a new linear polarizer technology that overcomes these and other limitations.

SUMMARY

This disclosure describes, in one aspect a linear polarizer layer formed by an anionic birefringent aromatic polymer and a cationic dye. In some embodiments, the linear polarizer includes two or more cationic dyes. In some embodiments, the linear polarizer also includes iodide anions.

In another aspect, this disclosure describes a method for forming a polymeric polarizer layer. Generally, the method includes shear-coating a liquid crystal solution on a substrate. The liquid crystal solution includes an anionic birefringent polymer.

In some embodiments, the liquid crystal solution includes one or more cationic dyes. In some embodiments, the method further includes applying a passivation solution to the polymeric polarizing layer giving a linear polarizer layer. The passivation solution includes multivalent cations.

In some embodiments, the method further includes applying a staining solution to the polymeric coating layer giving a linear polarizer layer. The staining solution includes iodide anions. In some embodiments, the method further includes applying a passivation solution to the linear polarizer layer. The passivation solution generally includes multivalent cations.

In some embodiments, the method further includes applying a staining-passivation solution to the polymeric polarizing layer. The staining-passivation solution includes one or more cationic dyes and multivalent cations.

In yet another aspect, the present disclosure describes optical articles and method of making optical articles that include a linear polarizer layer of anyone of the previous aspects or embodiments.

The above summary is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

Figure 1:
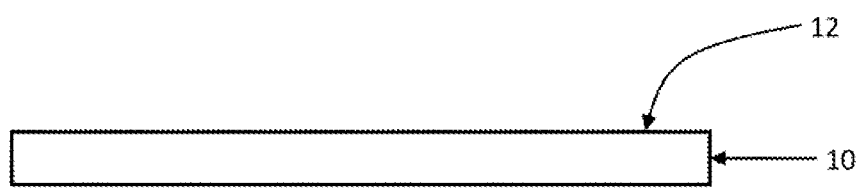
FIG. 1 is a cross-sectional view of an illustrative coatable substrate.

The present disclosure relates to method of forming linear polarizers from anionic birefringent aromatic polymers complexed with one or more dyes and optionally iodine. The present disclosure also relates to linear polarizers that include a polymeric birefringent coating layer containing a dye. There are generally three methods described to form the dye containing polymeric birefringent coating layer.

According to the first embodiment, a dye containing polymeric birefringent coating layer is formed by shear-coating a mixture of a polymeric lyotropic liquid crystal solution and a dye or a mixture of dyes.

According to the second embodiment, a polymeric birefringent coating layer is formed by shear-coating a polymeric lyotropic liquid crystal solution and the polymeric birefringent coating layer is converted into a dye containing polymeric birefringent coating layer by staining in a staining solution that contains a dye or a mixture of dyes.

According to the third embodiment, a dye and iodine containing polymeric birefringent coating layer is formed by shear-coating a polymeric lyotropic liquid crystal solution that contains a dye or a mixture of dyes to result in a dye containing polymeric birefringent coating layer that is then stained in a staining solution that contains iodine.

Substrate

Coating layers with high polarization efficiencies were demonstrated. Generally, the substrate can be made of various materials, for example, glass, silicon, quartz, sapphire, plastic, a polymer, or combinations thereof. The substrate can be in various forms, such as a film, a sheet, or a plate. Polymeric substrates can be, for example, cellulose triacetate (TAC); polyethylene terephthalate (PET), poly (methyl methacrylate) (PMMA), polycarbonate (PC), or a cyclic-olefin polymer (COP). The substrate may be pre-treated before coating of the coating liquid to improve adhesion of the coating liquid and coating layer to the substrate. For example, the substrate may be corona treated, saponified, plasma treated, and/or primed with a primer. In some embodiments, the substrate is an optically clear adhesive (OCA) film such as an acrylic OCA film in which the coating liquid is coated on, and the coating layer is formed on, the adhesive layer of the OCA film. In some embodiments, the substrate is an optical element. The term "optical element" refers to any element that has an optical function, such as focusing light, diffusing light, polarizing light, recycling light, filtering certain colors of the spectrum, and the like. Examples of optical elements include prism film, diffuser film, brightness enhancement film, micro-lens film, color-filter array, lens, linear polarizer, circular polarizer, reflective polarizer, and the like. In the detailed description below, the substrate used is a cellulose triacetate (TAC) substrate, unless otherwise specified.

Various methods of coating the coatable liquid on the substrate are available. The coating method can be a batch process or an in-line process. In a batch process, substrates is generally in the form of sheets or plates. Suitable coating methods in a batch process include slit coating, spin coating, and spray coating. In an in-line process, the substrate is generally a roll of film. Suitable coating methods in an in-line (roll-to-roll) process include slot-die coating, micro-gravure coating, and comma coating.

Birefringent Aromatic Polymer

The anionic polymeric lyotropic liquid crystal or its mixture with cationic dyes includes a birefringent aromatic polymer. Anionic birefringent aromatic polymers capable of forming a lyotropic liquid crystal in aqueous solution are used. The anionic birefringent aromatic polymers can include, for example, copolymers and block copolymers. The concentration of the anionic birefringent aromatic polymer in solution should be high enough that a liquid crystal phase is obtained. However, the concentration of the anionic birefringent aromatic polymer should be low enough that the viscosity of the lyotropic liquid crystal solution is suitable for coating. In some embodiments, the anionic birefringent aromatic polymer can be of the general structure (A):

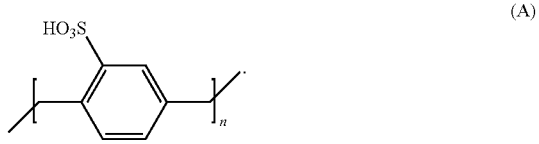

(A)

or an alkali metal, ammonium, or quaternary ammonium salt thereof, wherein the number (n) of segments of structure (A) in the anionic birefringent aromatic polymer ranges from 25 to 10,000. The anionic birefringent aromatic polymer of structure (A) is referred to as poly(monosulfo-p-xylene). Examples of alkali metals for alkali metal salts of structure (A) are Li, Na, K, and Cs. Please refer to Example 1 for a description on the preparation of the birefringent aromatic polymer of structure (A).

In some embodiments, the anionic birefringent aromatic polymer can be of the general structure (B):

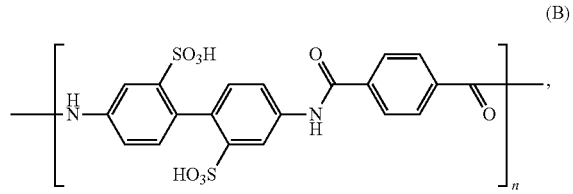

(B)

or an alkali metal, ammonium, or quaternary ammonium salt thereof, wherein the number (n) of segments of structure (B) in the anionic birefringent aromatic polymer ranges from 20 to 20,000. The anionic birefringent aromatic polymer of structure (B) is referred to as poly(2,2'-disulfo-4,4'-benzidine terephthalamide). Refer to Example 2 for a description on the preparation of the birefringent aromatic polymer of structure (B).

Cationic Dye

In some embodiments, the anionic polymeric lyotropic liquid crystal includes one or more cationic dyes. Both commercially available and specialty cationic dyes can be mixed with the anionic polymeric lyotropic liquid crystal. The commercially available cationic dyes include but are not limited to Basic Yellow 1, Basic Yellow 6, Basic Yellow 28, Basic Yellow 29, Basic Yellow 40, Basic Orange 21, Basic Red 5, Basic Red 14, Basic Red 15, Basic Red 18, Basic Red 22, Basic Red 46, Basic Red 51, Basic Blue 3, Basic Blue 9, Basic Blue 41, Basic Blue 54, Basic Violet 7, Basic Violet 15, Basic Violet 16. Specialty cationic dyes include but not limited to MDEPAP (TCI America); 4-[4-(Dimethylamino) styryl]-1-methylpyridinium iodide (Sigma Aldrich).

In some embodiments, the cationic dye includes two cationic dyes that cooperate to form a grey or colorless polarizer. In some embodiments, the cationic dye includes three cationic dyes that cooperate to form a grey or colorless polarizer. In some embodiments, the cationic dye includes two or three cationic dyes that cooperate to form a grey polarizer. In some embodiments, the cationic dye includes two or three cationic dyes that cooperate to form a colorless polarizer.

In some embodiments, the specialty cationic dye can have the general structure:

A-D

A-Y$_1$=Y$_2$-D,

A-Y$_1$=Y$_2$-E-Y$_3$=Y$_4$-D, or

A-Y$_1$=Y$_2$-E$_1$-Y$_3$=Y$_4$-E$_2$-Y$_5$=Y$_6$-D.

In the above structures A is selected from the following cationic substructure

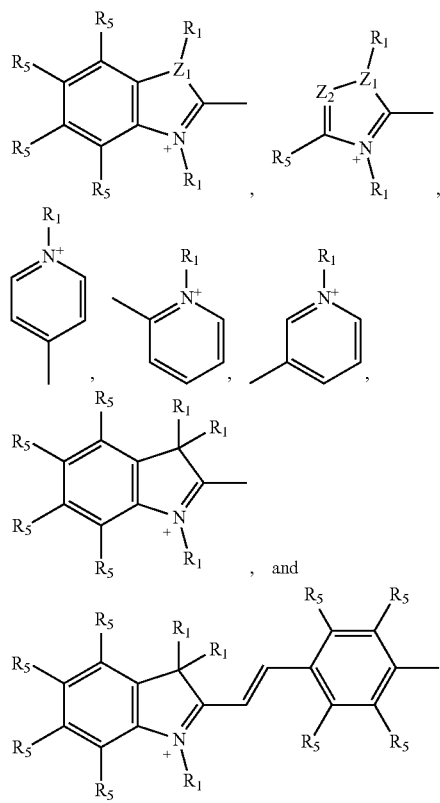

where the positive charge of the cation compensated by an anion. Example of anions include F$^-$, Cl$^-$, Br$^-$, I$^-$, HCOO$^-$, CH$_3$COO$^-$, H$_2$PO$_4^-$, SO$_4^{2-}$, CH$_3$SO$_4^-$, BF$_4^-$, ClO$_4^-$.

R$_1$ are each independently alkyl or phenyl groups. R$_5$ are each independently H, alkyl, hydroxy, alkoxy, F, Cl, Br, I, amine, alkylamine, or NO$_2$.

Z$_1$ and Z$_2$ are each independently S, O, CH, or N.

Y$_1$, Y$_2$, Y$_3$, Y$_4$, Y$_5$, Y$_6$, are each independently CH or N.

E, E$_1$, and E$_2$ are each independently

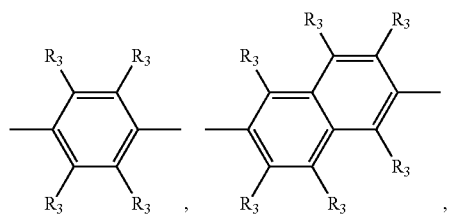

-continued

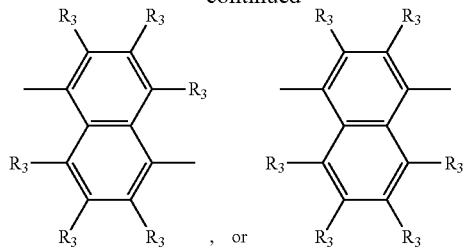

where each R$_3$ is independently H, alkyl, hydroxy, alkoxy, F, Cl, Br, I, amine, alkylamine, NO$_2$.

D is any of the structures of A or

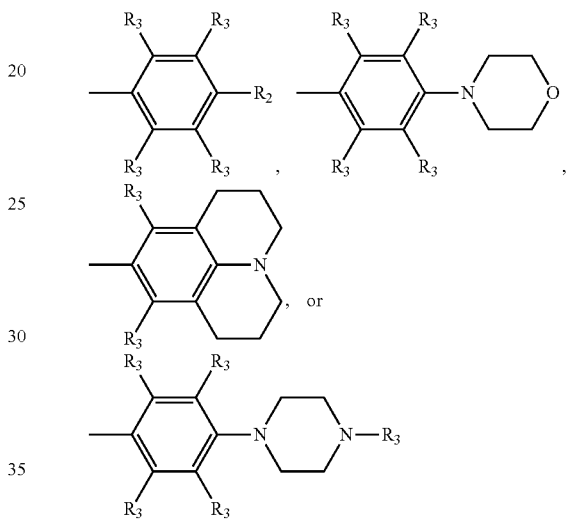

where R$_2$ is selected from NH$_2$, NHR$_4$, NR$_4$R$_6$, OH, OR$_6$. R$_4$ and R$_6$ are each independently CH$_3$, C$_2$H$_5$, C$_3$H$_7$, C$_4$H$_9$, CH$_2$OH, C$_2$H$_4$OH, C$_3$H$_6$OH, CH$_2$CN, CH$_2$-Ph, C$_2$H$_4$CN, CH$_2$Cl, CH$_2$Br, C$_2$H$_4$Cl, C$_2$H$_4$Br, C$_2$H$_4$-Ph (Ph is Phenyl).

In some embodiments the cationic dye is dye (C), dye (D), dye (E), dye (F), dye (G), dye dye (H), dye (K), dye (L), or combinations thereof. Please refer to Example 3 for a description on how to prepare the cationic dye C. Please refer to Example 4 for a description on how to prepare the cationic dye G. Please refer to Example 5 for a description on how to prepare the cationic dye K. Please refer to Example 6 for a description on how to prepare the cationic dye L.

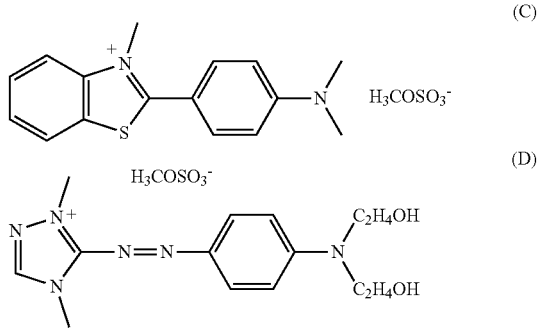

-continued

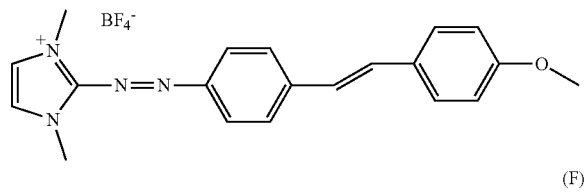
(E)

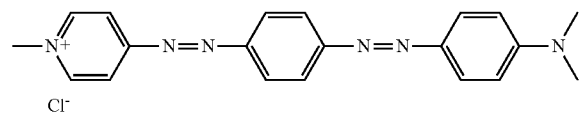
(F)

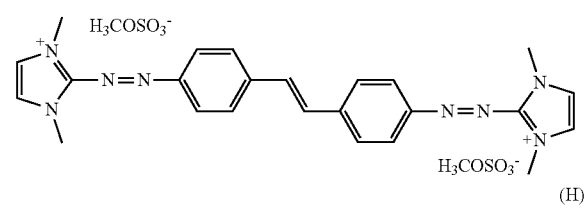
(G)

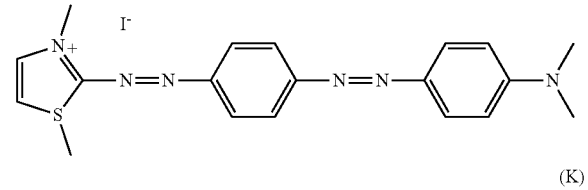
(H)

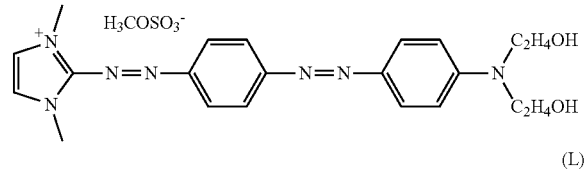
(K)

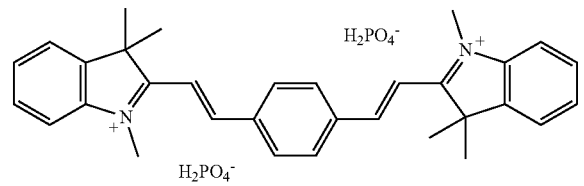
(L)

Passivation Solution

In some embodiments the anionic polymeric lyotropic liquid crystal is treated with a passivation solution or a staining-passivation solution. The passivation solution or the staining-passivation solution includes multi-valent cations. For example, $Sr^{2+}$ and $Al^{3+}$ are examples of the multi-valent cations used for preparation of the passivation and staining-passivation solutions. If using $Sr^{2+}$ as the multi-valent cations, the cations can be obtained by dissolving $SrCl_2$ in water. Example 7 shows the case where the weight ratio of $SrCl_2$:water is 10:100. More generally, the weight ratio of $SrCl_2$:water can vary between 1:100 and 20:100. If using $Al^{3+}$ as the multi-valent cations, the cations can be obtained by dissolving $AlCl_3$ in water. The weight ratio of $AlCl_3$:water can vary between 1:100 and 20:100. Water can be used as the sole solvent of the passivation solution. Other examples of possible solvents are: methanol, ethanol, propanol, butanol, acetone, methyl ethyl ketone, ethyl methyl ether, and diethyl ether. Alternatively, a mixture can be used as a solvent. For example, a water:ethanol mixture can be used as the solvent, with the water:ethanol ratio ranging between 50:50 and 100:0.

Methods of Forming a Linear Polarizer Layer

First Method

Figure 3:
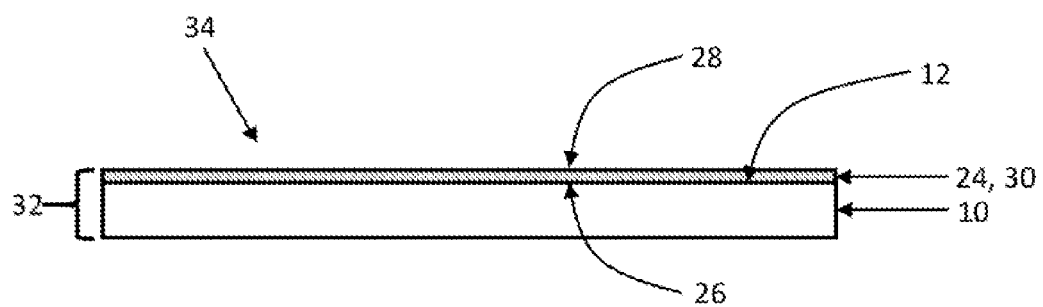
FIG. 3 is a cross-sectional view of a coated substrate, according to a first, a second, and a third embodiment.
Figure 4:
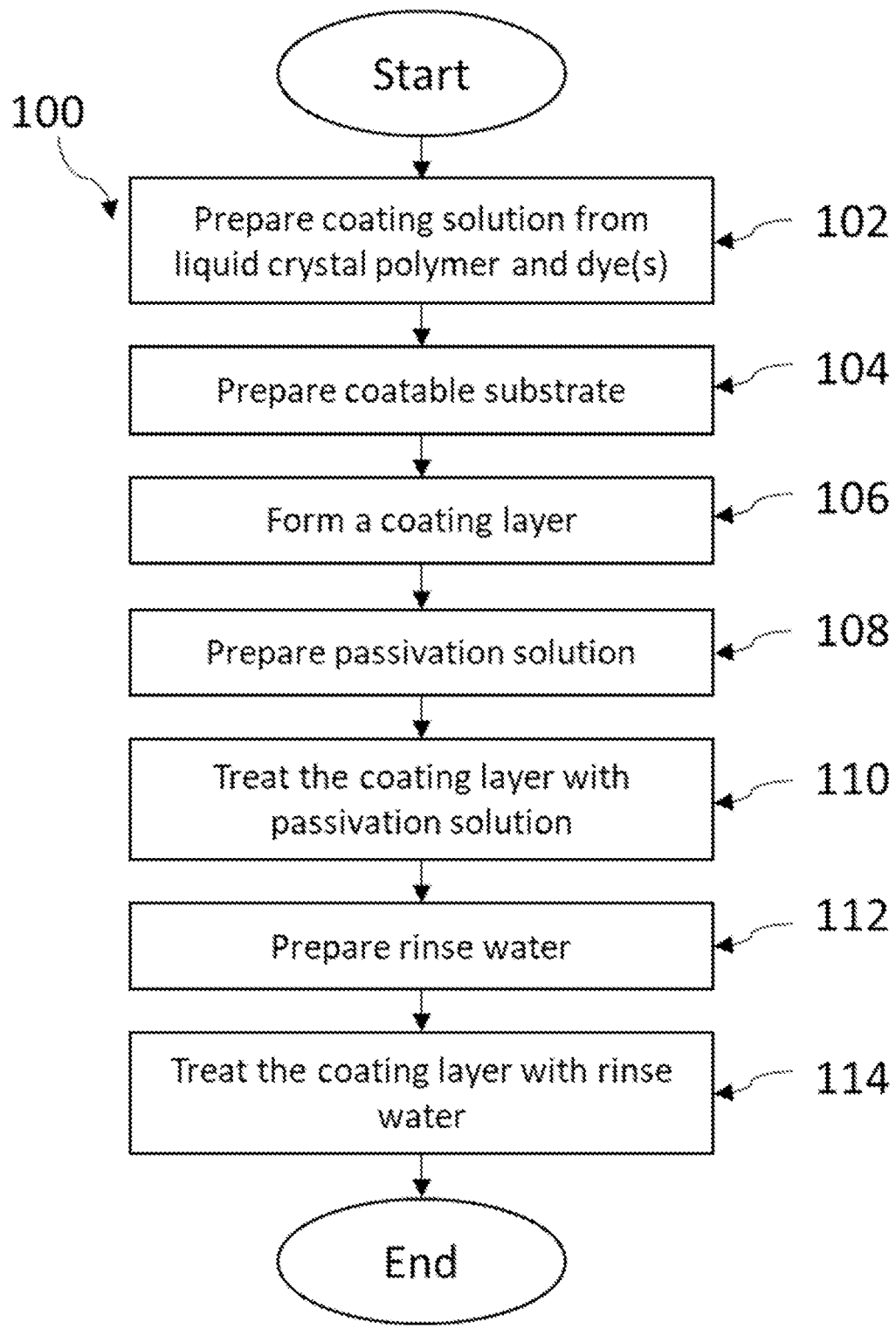
FIG. 4 is a schematic diagram of a method of forming an illustrative linear polarizer according to a first embodiment.

FIG. 4 illustrates a method 100 that may be used to form a linear polarizer according to the first embodiment. The steps of method 100 can be understood in accordance with FIG. 1, FIG. 2, and FIG. 3.

At step 102, a polymeric lyotropic liquid crystal solution is prepared. In this embodiment, the polymeric lyotropic liquid crystal solution is a multi-component lyotropic liquid crystal solution. This multi-component lyotropic liquid crystal solution includes an anionic birefringent aromatic polymer and water. The multi-component lyotropic liquid crystal solution also includes one or more cationic dyes. The anionic birefringent aromatic polymer may be any anionic birefringent aromatic polymer previously discussed above. The cationic dye may be any cationic dye previously discussed above. At step 104, a coatable substrate is prepared. A coatable substrate 10 is shown in FIG. 1. The coatable substrate 10 includes a coatable surface 12. An example of a coatable substrate is a glass substrate. Another example of a coatable substrate is a TAC film substrate. Step 104 may include cleaning the substrate to reduce particles, and/or coating the substrate with any suitable primer.

Figure 2:
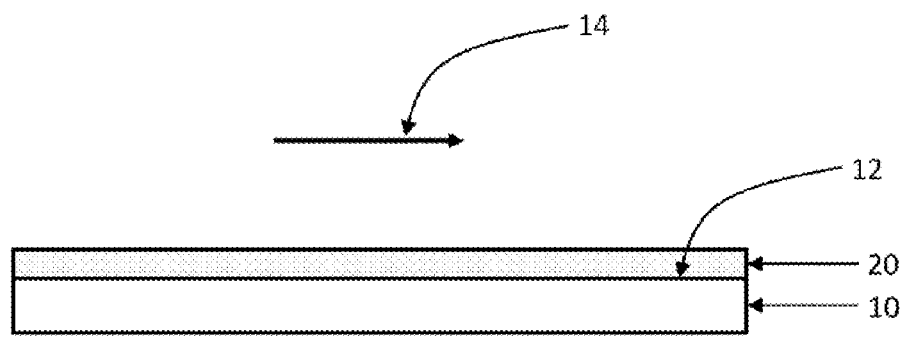
FIG. 2 is a cross-sectional view of an illustrative coatable substrate upon which a polymeric coating layer is shear-coated according to a first, a second, and a third embodiments.

With continuing reference to FIG. 4, a polymeric coating layer is formed on the coatable substrate (step 106). In embodiment 1, the polymeric coating layer is a polymeric polarizing coating layer. The polymeric lyotropic liquid crystal solution, prepared at step 102, is shear-coated on the coatable surface 12 of the coatable substrate 10 (FIG. 2). The preparation of the polymeric coating layer according to the first embodiment is explained with reference to FIGS. 2 and 3. FIG. 2 is a cross-sectional view of the coatable substrate 10 upon which a polymeric lyotropic liquid crystal solution layer 20 has been formed by shear-coating along a shear-coating direction (arrow 14). The step of shear-coating a polymeric lyotropic liquid crystal solution can be done by any suitable process, such as a slit coating process. The polymeric lyotropic liquid crystal solution layer 20 is dried to form a polymeric coating layer 24 on the coatable substrate 10 having high polarization efficiency in the visible spectral range.

FIG. 3 is a cross-sectional view of linear polarizer 34 according to the first embodiment, which includes polymeric coating layer 24 and the coatable substrate 10. The polymeric coating layer 24 has two major surfaces. Inner major surface 26 is in contact with the coatable surface 12 of the coatable substrate 10. Outer major surface 28 is opposite of polymeric coating layer 24 inner major surface 26 and is shown as being exposed in FIG. 3.

The polymeric coating layer 24 (for all three methods) is preferably 3.0 micrometers or less in thickness, and more preferably 1.0 micrometers or less in thickness. The polymeric coating layer 24 is preferably from 0.5 to 3.5 micrometers in thickness, or from, 0.5 to 1.5 micrometers in thickness, and more preferably 0.5 to 1.0 micrometers in thickness.

Figure 8:
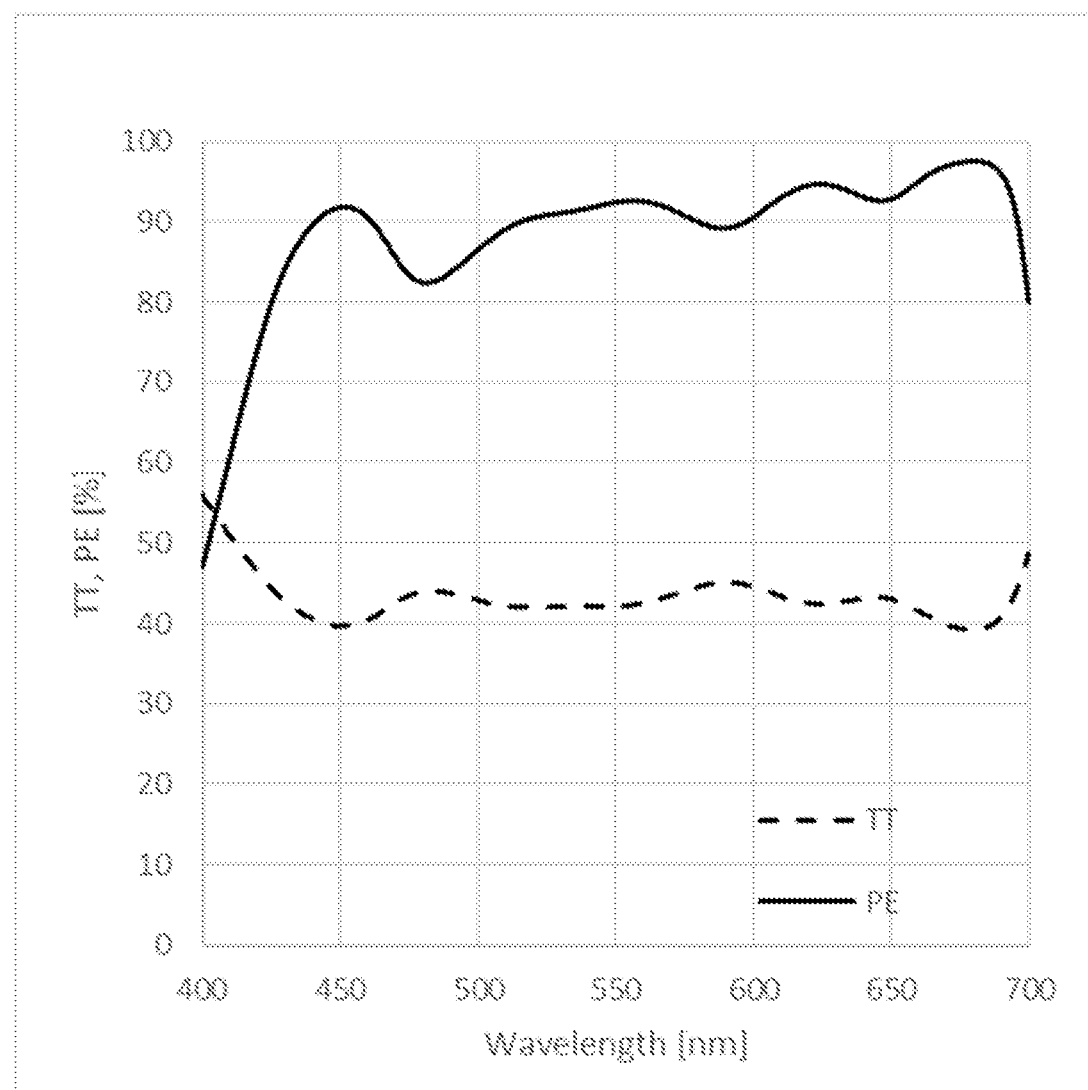
FIG. 8 is a graph of the wavelength dependence of the total transmittance (TT) and polarization efficiency (PE) of a coated linear polarizer layer, comprising a birefringent aromatic polymer of structure (A), according to the first embodiment.

With continuing reference to FIG. 8, a passivation solution is prepared (step 108), and then the polymeric coating layer 24 is treated with the passivation solution (step 110). The passivation solution includes multi-valent cations. The multi-valent cations render the polymeric coating layer insoluble in water, by an ion exchange process. In this ion exchange process, monovalent ions of the birefringent aromatic polymers are exchanged for divalent or trivalent cations (multi-valent cations). Examples of multi-valent cations are: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the polymeric coating layer 24 would contain one or more multi-valent cations. In preparing the passivation solution, multi-valent cations are obtained by dissolving certain salts and/or compounds in solution. Examples of these salts or compounds used to obtain multi-valent cations include $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$. At step 110, the polymeric coating layer 24 is treated with the passivation solution giving linear polarizer layer 30. For example, step 110 may include dipping the coated substrate 32 in the passivation solution. Alternatively, step 110 may include imprinting, spray coating, ink jet printing, or flexo-printing.

Next, it is preferable to remove excess passivation solution from the linear polarizer layer 30. This can be carried out by spin-drying the coated substrate 32. Alternatively, the coated substrate 32 can be treated with a rinse solution and then dried. This case is illustrated in FIG. 8. A rinse solution is prepared (step 112), and then the linear polarizer layer 30 is treated with the rinse solution (step 114). For example, the rinse solution is de-ionized water. For example, step 114 may include submerging the coated substrate 32 in the rinse solution. After rinsing, the coated substrate 32 is dried. Treating the linear polarizer layer 30 with the rinse solution helps to improve the properties of the linear polarizer layer 30. This completes the steps in forming a linear polarizer 34.

Figure 7:
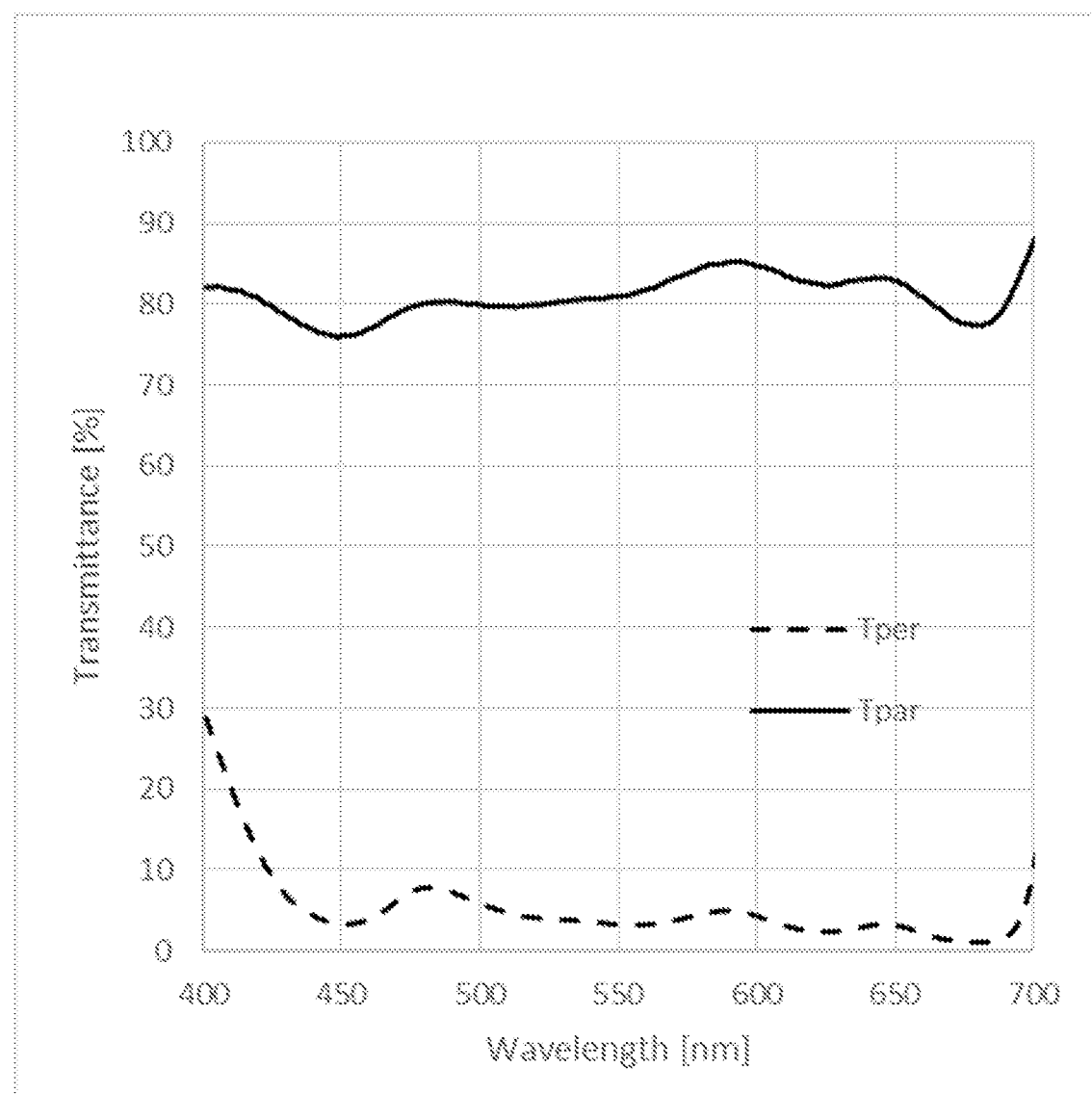
FIG. 7 is a graph of the wavelength dependence of the perpendicular transmittance (Tmin) and parallel transmittance (Tmax) of a coated linear polarizer layer, comprising a birefringent aromatic polymer of structure (A), according to the first embodiment.
Figure 13:
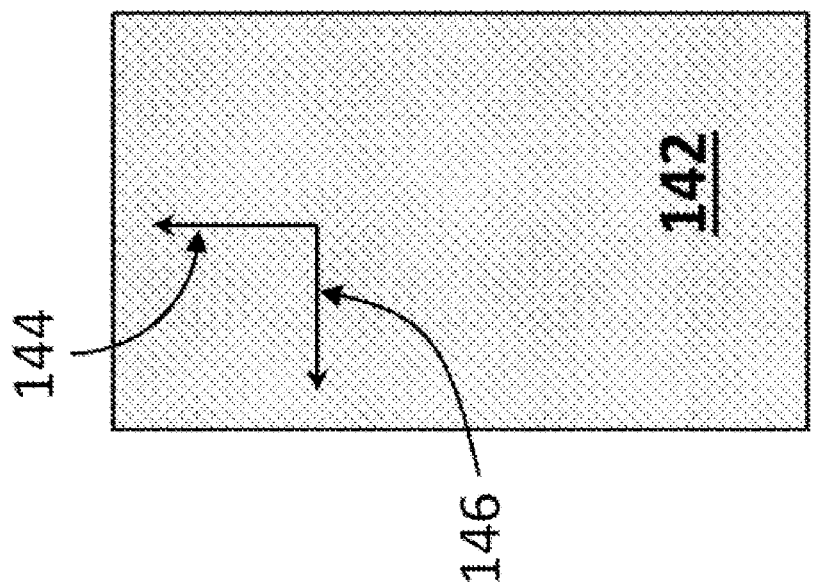
FIG. 13 is a schematic top view of an illustrative linear polarizer.

Optical properties of an exemplary linear polarizer layer consistent with the method of first embodiment were measured. The exemplary linear polarizer layer was formed from a 2.5 µm thick multi-component polymeric polarizing coating including the polymer from Example 1 and the cationic dyes described in Examples 4, 5, and 6. The exemplary linear polarizer layer was treated with a passivation solution and rinsed according to Example 7. FIG. 7 and FIG. 8 shows graphs of the wavelength dependence of the perpendicular transmittance (Tmin) and parallel transmittance (Tmax) as well as the total transmittance (TT) and polarization efficiency (PE) of the sample prepared according to Example 7. At 550 nm, TT=41.2% and PE=92.2%. When averaged over the spectral range of 400 nm-700 nm, TT=42.0% and PE=90.6%. The quantities TT (total transmittance), PE (polarization efficiency), and Kd (dichroic ratio) are explained with reference to FIG. 13. FIG. 13 is a top view of an illustrative linear polarizer layer 142. A polymeric lyotropic liquid crystal solution which contains a birefringent aromatic polymer has been shear-coated along an in-plane direction 144. As a result of the shear-coating, the birefringent aromatic polymer is generally aligned along in-plane direction 144. In-plane direction 144 is equivalent to direction 14 in FIG. 2. FIG. 13 shows two in-plane directions: in-plane direction 144, along which optical absorption would be approximately maximum (transmission approximately minimum), and an orthogonal direction 146, orthogonal to in-plane direction 144, along which optical absorption would be approximately minimum (transmission approximately maximum). Linear polarizer transmittance for polarization along in-plane direction 144 is referred to as Tmin and linear polarizer transmittance for polarization along orthogonal direction 146 is referred to as Tmax. Total transmittance is calculated as TT=½(Tmin+Tmax), polarization efficiency is calculated as PE=100 (Tmax−Tmin)/(Tmax+Tmin), and dichroic ratio is calculated as Kd=ln (Tmin/100)/ln(Tmax/100).

Second Method

Figure 5:
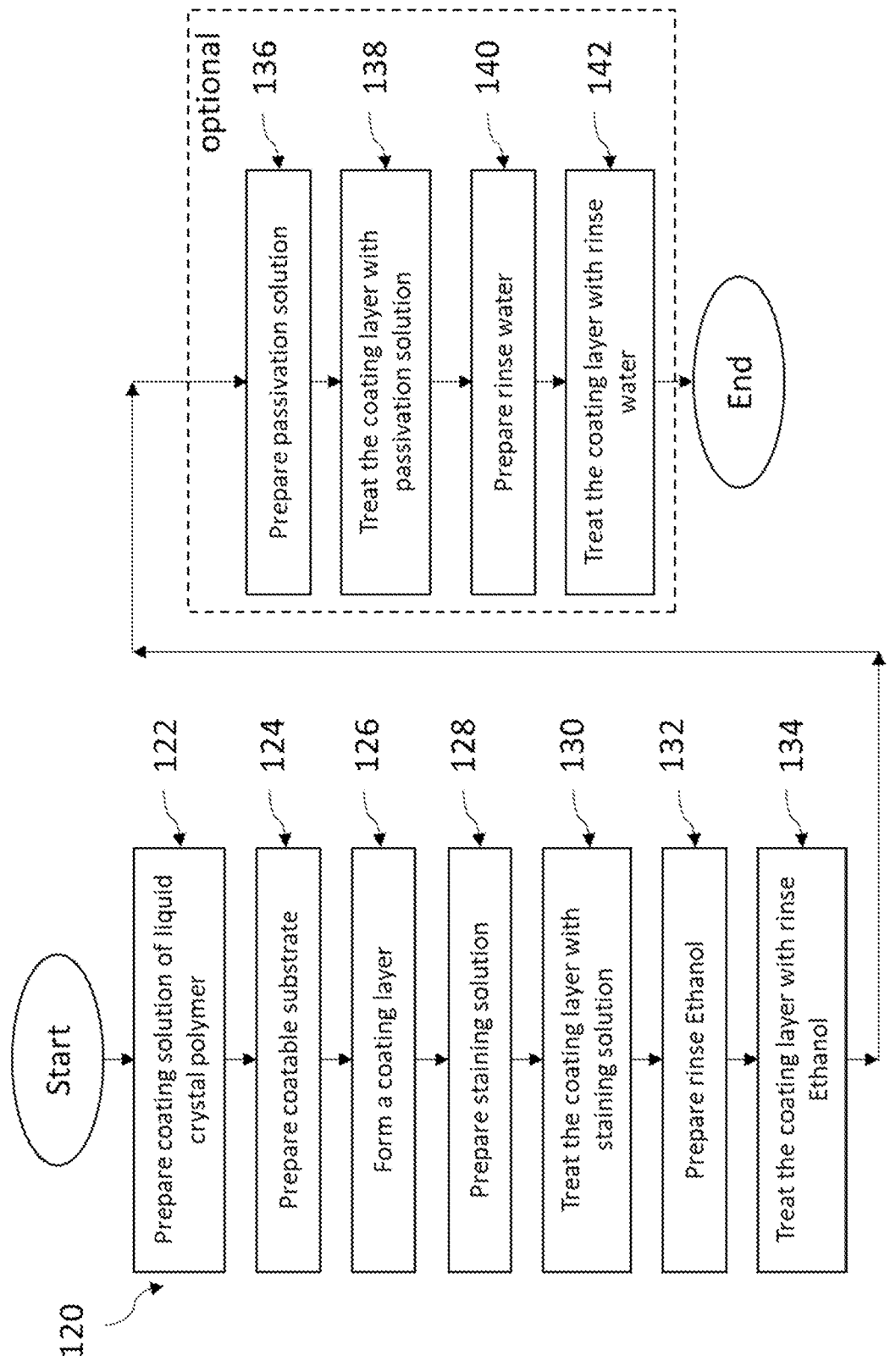
FIG. 5 is a schematic diagram of a method of forming an illustrative linear polarizer according to a second embodiment.

FIG. 5 illustrates a method 120 that may be used to form a linear polarizer according to a second embodiment. The steps of method 120 can be understood in accordance with FIG. 1, FIG. 2, and FIG. 3.

At step 122, a polymeric lyotropic liquid crystal solution is prepared. The polymeric lyotropic liquid crystal solution is an aqueous solution that includes an anionic birefringent aromatic polymer. The anionic birefringent aromatic polymer may be any anionic birefringent aromatic polymer previously discussed above. At step 124, a coatable substrate is prepared. A coatable substrate 10 is shown in FIG. 1. The coatable substrate 10 includes a coatable surface 12. An example of a coatable substrate is a glass substrate. Another example of a coatable substrate is a TAC film substrate. Step 124 may include cleaning the substrate to reduce particles, and/or coating the substrate with a primer.

With continuing reference to FIG. 5, a polymeric coating layer is formed on the coatable substrate (step 126). In this embodiment, the polymeric coating layer is a polymeric birefringent coating layer. The polymeric lyotropic liquid crystal solution, prepared at step 122, is shear-coated on the coatable surface 12 of the coatable substrate 10. The preparation of the polymeric coating layer according to the second embodiment is explained with reference to FIGS. 4 and 5. FIG. 4 is a cross-sectional schematic diagram view of the coatable substrate 10 upon which polymeric lyotropic liquid crystal solution layer 20 has been formed by shear-coating along a shear-coating direction (arrow 14), according to the second embodiment. The step of shear-coating a multi-component lyotropic liquid crystal solution can be done by any suitable process, such as a slit coating process. The polymeric lyotropic liquid crystal solution layer 20 is dried to form a polymeric coating layer 24 on the coatable substrate 10, as shown schematically in cross-section in FIG. 3.

FIG. 3 is a cross-sectional view of linear polarizer 34 according to the first embodiment, which includes polymeric coating layer 24 and the coatable substrate 10. The polymeric coating layer 24 has two major surfaces. Inner major surface 26 is in contact with the coatable surface 12 of the coatable substrate 10. Outer major surface 28 is opposite of coating layer inner major surface 26 and is shown as being exposed in FIG. 3.

With continuing reference to FIG. 5, a staining solution is prepared (step 128) and then the polymeric coating layer 24 is treated with the staining solution (step 130).

The staining solution includes cationic dyes. The cationic dye one or more of any cationic dye previously discussed above. Additionally, the staining solution may contain multi-valent cations. The cationic dyes are dissolved in aqueous solution at a controlled pH. The multi-valent cations render the polymeric coating layer 24 insoluble in water, by an ion exchange process. In this ion exchange process, monovalent ions of the anionic birefringent aromatic polymers are exchanged for divalent or trivalent cations (multi-valent cations). Examples of multi-valent cations include $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the polymeric coating layer 24 would contain one or more multi-valent cations. In preparing the staining-passivation solution, multi-valent cations are obtained by dissolving certain salts and/or compounds in solution. Examples of salts or compounds used to obtain multi-valent cations include are: $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$.

At step 130, the polymeric coating layer is treated with the staining solution. For example, step 130 may include dip-coating the coated substrate 32 in the staining solution. Alternatively, step 130 may include imprinting, spray coating, ink jet printing, or flexo-printing. The polymeric coating layer 24, which is substantially non-polarizing in the visible spectral range, is transformed into a linear polarizer layer 30 having high polarization efficiency in the visible spectral range.

Next, it is preferable to remove excess staining solution from the linear polarizer layer 30. This can be carried out by treating the coated substrate 32 with a rinse solution, followed by drying. This case is illustrated in FIG. 5. A rinse solution is prepared (step 132), and then linear polarizer layer 30 is treated with the rinse solution (step 134). For example, the rinse solution is ethanol. For example, step 134 may include submerging the coated substrate 32 in the rinse solution. After rinsing the coated substrate 32 is dried. This completes the steps in forming a linear polarizer 34 according to the second embodiment.

In some embodiments, steps 136-142 are completed. Steps 136-142 are optional steps for rendering the linear polarizer layer water-insoluble and are similar to the steps 108-114 in FIG. 4 explained in the first embodiment. With continuing reference to FIG. 5, a passivation solution is prepared (step 136), and then the linear polarizer layer 30 is treated with the passivation solution (step 138). The passivation solution is a solution containing multi-valent cations. The multi-valent cations render the linear polarizer layer 30 insoluble in water, by an ion exchange process. In this ion exchange process, monovalent ions of the anionic birefringent aromatic polymers are exchanged for divalent or tri-valent cations (multi-valent cations). Examples of multi-valent cations include $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the linear polarizer layer 30 would contain one or more multi-valent cations. In preparing the staining-passivation solution, multi-valent cations are obtained by dissolving certain salts and/or compounds in solution. Examples of salts or compounds used to obtain multi-valent cations include: $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$. At step 138, the linear polarizer layer 30 is treated with the passivation solution. For example, step 138 may include dipping the coated substrate 32 in the passivation solution. Alternatively, step 138 may include imprinting, spray coating, ink jet printing, or flexo-printing.

Next, it is preferable to remove excess passivation solution from the linear polarizer layer 30. This can be carried out by spin-drying the coated substrate 32. Alternatively, the coated substrate 32 can be treated with a rinse solution and then dried. This case is illustrated in FIG. 5. A rinse solution is prepared (step 140), and then the linear polarizer layer 30 is treated with the rinse solution (step 142). For example, the rinse solution is de-ionized water. For example, step 142 may include submerging the coated substrate 32 in the rinse solution. After rinsing the coated substrate 52 is dried. Treating the linear polarizer layer with the rinse solution helps to improve the properties of the linear polarizer layer. This completes the steps in forming a linear polarizer 34 according to the methods of embodiment two, including the additional optional steps 136-142.

Figure 9:
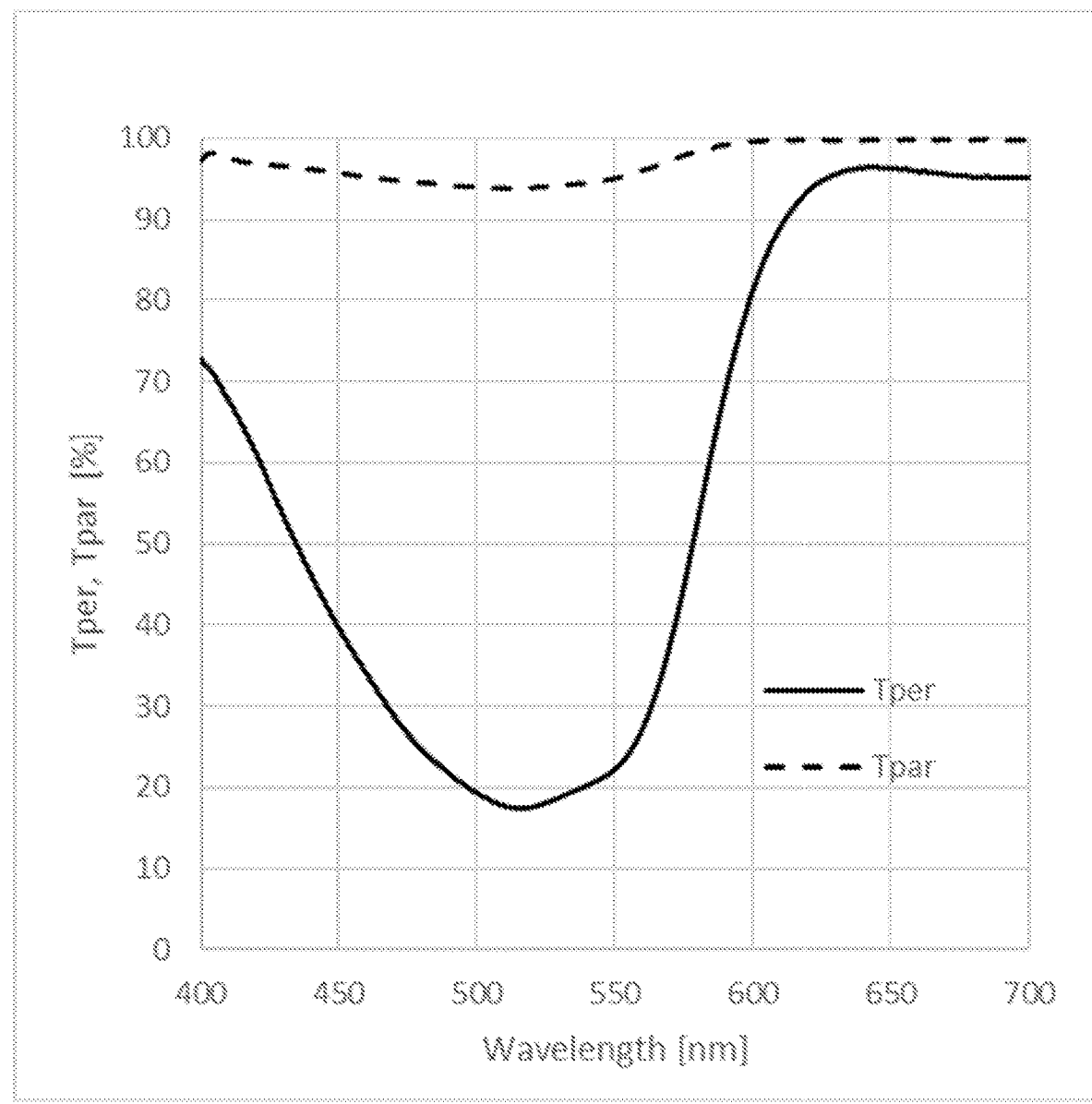
FIG. 9 is a graph of the wavelength dependence of the perpendicular transmittance (Tmin) and parallel transmittance (Tmax) of a stained linear polarizer layer, according to the second embodiment.
Figure 10:
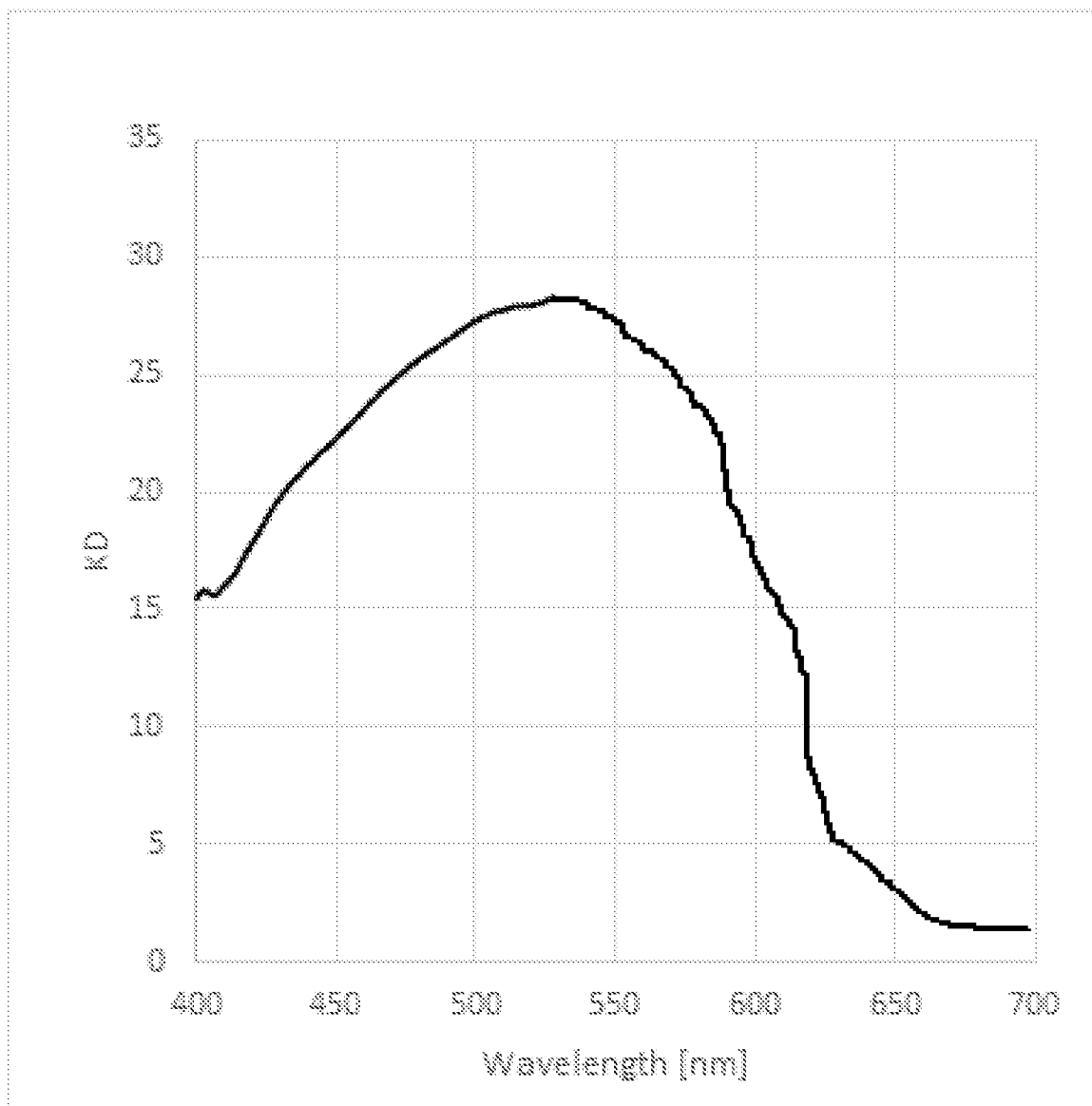
FIG. 10 is a graph of the wavelength dependence of the dichroic ratio (KD) of a linear polarizer layer, consisting of a stained birefringent aromatic polymer of structure (A), according to the second embodiment.

Optical properties of an exemplary linear polarizer layer consistent with the method of second embodiment were measured. The exemplary linear polarizer layer was formed from a 0.8 µm thick, polymeric coating layer that included the polymer of Example 1. The polymeric coating layer was treated with the staining solution including Red Dye (G) according that was prepared according to Example 4. FIG. 9 is a graph of the wavelength dependence of the perpendicular transmittance (Tmin) and parallel transmittance (Tmax) of the sample according to Example 4. FIG. 10 is a graph of the wavelength dependence of the dichroic ratio (KD) of the sample prepared according to Example 8. At peak absorption 520 nm, TT=58.5%, PE=61.9%, and Kd=26.9.

Third Method

Figure 6:
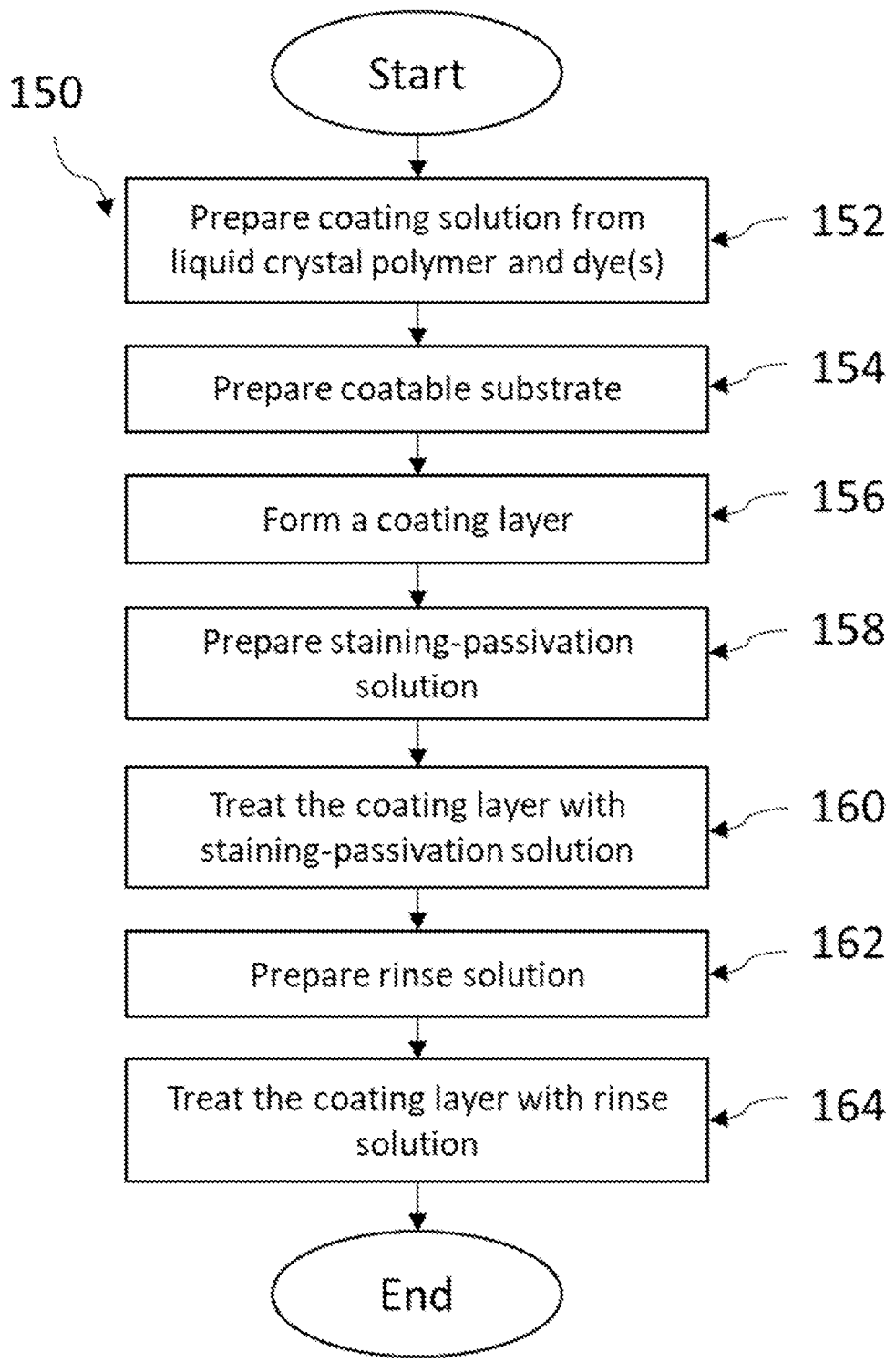
FIG. 6 is a schematic diagram of a method of forming an illustrative linear polarizer according to a third embodiment.

FIG. 6 illustrates a method 150 that may be used to form a linear polarizer according to a third embodiment. The steps of method 150 can be understood in accordance with FIG. 1, FIG. 2, and FIG. 3.

At step 152, a polymeric lyotropic liquid crystal solution is prepared. In this embodiment, the polymeric lyotropic liquid crystal solution is a multi-component polymeric lyotropic liquid crystal solution similar to the multi-component polymeric lyotropic liquid crystal solution of the first embodiment (FIG. 4, step 102) in that it includes an anionic birefringent aromatic polymer, water, and one or more cationic dye. The anionic birefringent aromatic polymer may be any anionic birefringent aromatic polymer previously discussed above. The cationic dye may be any cationic dye previously discussed above. At step 154, a coatable substrate is prepared. A coatable substrate 10 is shown in FIG. 1. The coatable substrate 10 includes a coatable surface 12. An example of a coatable substrate is a glass substrate. Another example of a coatable substrate is a TAC film substrate. Step 154 may include cleaning the substrate to reduce particles, and/or coating the substrate with a primer.

With continuing reference to FIG. 6, a polymeric coating layer is formed on the coatable substrate (step 156). In the second embodiment, the polymeric coating layer is a polymeric polarizing coating layer. The polymeric lyotropic liquid crystal solution, prepared at step 152, is shear-coated on the coatable surface 12 of the coatable substrate 10. The preparation of the polymeric coating layer according to the first embodiment is explained with reference to FIG. 2 and FIG. 3. FIG. 2 is a cross-sectional schematic diagram view of the coatable substrate 10 upon which a polymeric lyotropic liquid crystal solution layer 20 has been formed by shear-coating along a shear-coating direction (arrow 14), according to the third embodiment. The step of shear-coating a polymeric lyotropic liquid crystal solution can be done by any suitable process, such as a slit coating process. The polymeric lyotropic liquid crystal solution layer 20 is dried to form a polymeric coating layer 24 on the coatable substrate 10, as shown schematically in cross-section in FIG. 3. In the second embodiment, the polymeric coating layer is a polarizing polymeric coating layer.

FIG. 3 is a cross-sectional view of linear polarizer 34 according to the third embodiment, which includes polymeric coating layer 24 and the coatable substrate 10. The polymeric coating layer 24 has two major surfaces. Inner major surface 26 is in contact with the coatable surface 12 of the coatable substrate 10. Outer major surface 28 is opposite of coating layer inner major surface 26 and is shown as being exposed in FIG. 3

With continuing reference to FIG. 6, a staining-passivation solution is prepared (step 158) and then the polymeric coating layer 24 is treated with the staining-passivation solution (step 160). The staining-passivation solution is a solution that includes staining constituents and multi-valent cations. The staining constituents are iodine ($I_2$) and iodide salts that cause the polymeric coating layer 24 to become doped with iodine anions ($I_3^-$ and $I_5^-$ for example). The staining constituents are dissolved in aqueous solution. Examples of iodide salts include KI, $NH_4I$, LiI, NaI, CsI, $ZnI_2$, $AlI_3$, and $SrI_2$. These iodide salts, upon dissolution, yield the following cations respectively $K^+$, $NH_4^+$, $Li^+$, $Na^+$, $Cs^+$, $Zn^{2+}$, $Al^{3+}$, and $Sr^{2+}$. Upon staining with iodine anions, the polymeric coating layer 24 exhibits polarization. The multi-valent cations render the polymeric birefringent coating layer insoluble in water, by an ion exchange process. In this ion exchange process, monovalent ions of the birefringent aromatic polymers are exchanged for divalent or tri-valent cations (multi-valent cations). Examples of multi-valent cations include $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$. Therefore, after the ion exchange, the polymeric coating layer 24 would contain one or more multi-valent cations. In preparing the staining-passivation solution, multi-valent cations are obtained by dissolving certain salts and/or compounds in solution. Examples of salts or compounds used to obtain multi-valent cations include are: $Cr_2(SO_4)_3$, $BaCl_2$, $Mg(CH_3COO)_2$, $SrCl_2$, $AlCl_3$, $FeSO_4$, $Cu(CH_3COO)_2$, $Zn(CH_3COO)_2$, $ZnI_2$, $ZnBr_2$, $ZnSO_4$, $ZnCl_2$, $Ni(CH_3COO)_2$, and $Co(CH_3COO)_2$.

At step 160, the polymeric coating layer 24 is treated with the staining-passivation solution. For example, step 160 may include dip-coating the coated substrate 32 in the staining-passivation solution. Alternatively, step 160 may include imprinting, spray coating, ink jet printing, or flexo-printing. The polymeric coating layer 24 is transformed into a linear polarizer layer 30 having high polarization efficiency in the visible spectral range.

Next, it is preferable to remove excess staining solution from the linear polarizer layer 30. This can be carried out by treating the coated substrate 32 with a rinse solution, followed by drying. This case is illustrated in FIG. 10. A rinse solution is prepared (step 162), and then the linear polarizer layer 30 is treated with the rinse solution (step 164). For example, the rinse solution is ethanol. For example, step 164 may include submerging the coated substrate 72 in the rinse solution. After rinsing the coated substrate 72 is dried. This completes the steps in forming a linear polarizer 74 according to methods of the third embodiment.

Figure 11:
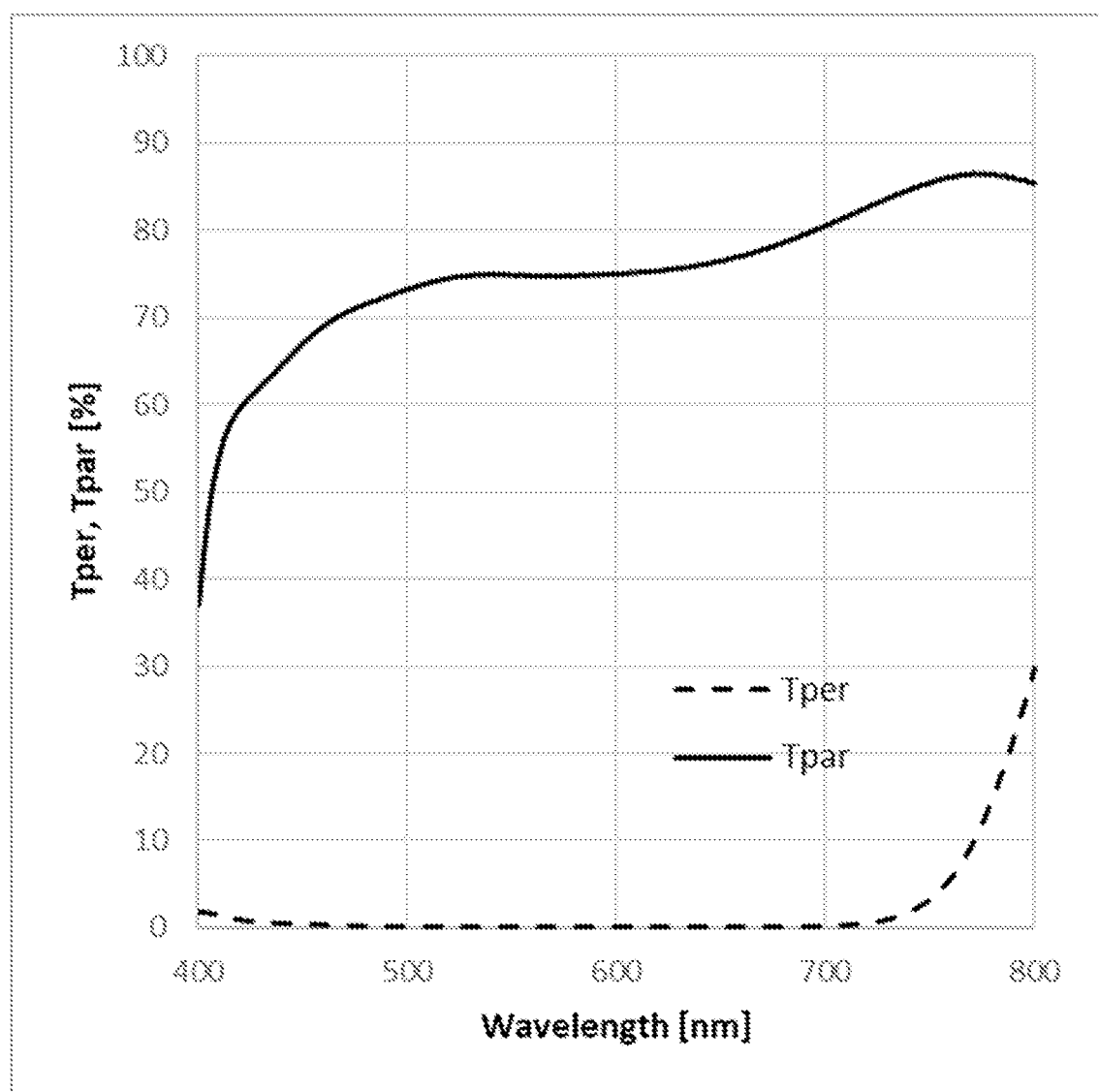
FIG. 11 is a graph of the wavelength dependence of the perpendicular transmittance (Tmin) and parallel transmittance (Tmax) of a coated and stained linear polarizer layer, comprising a birefringent aromatic polymer of structure (A), according to the third embodiment.
Figure 12:
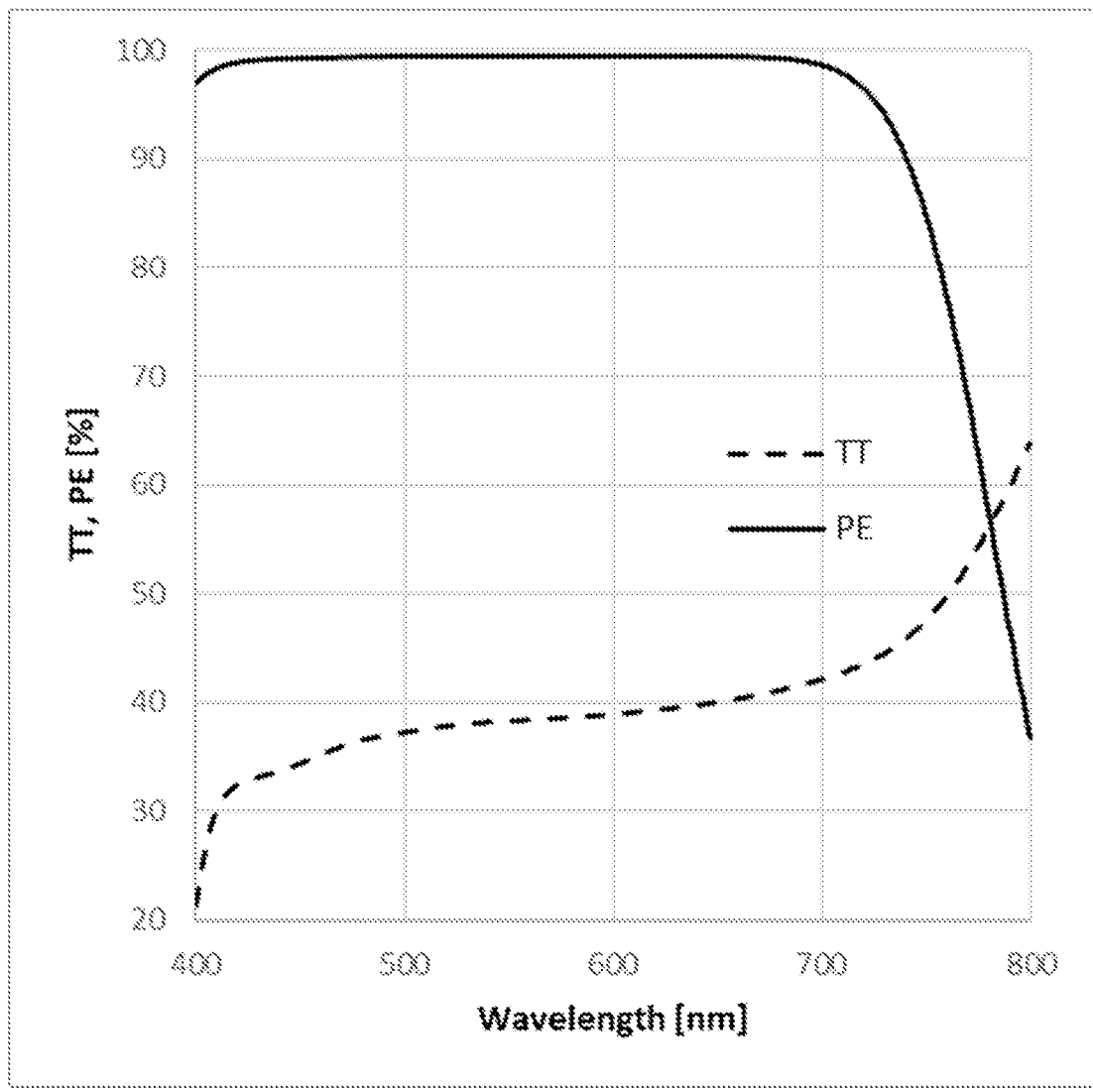
FIG. 12 is a graph of the wavelength dependence of the total transmittance (TT) and polarization efficiency (PE) of a coated and stained linear polarizer layer, consisting of a birefringent aromatic polymer of structure (A), according to the third embodiment.

Optical properties of an exemplary linear polarizer layer 30 consistent with the third embodiment were measured. The exemplary linear polarizer layer was formed from a 0.8 μm thick, multi-component birefringent coating that included the polymer of Example 1 and dye L which was prepared according to Example 9. FIG. 11 is a graph of the wavelength dependence of the perpendicular transmittance (Tmin) and parallel transmittance (Tpar), FIG. 12 is a graph of the wavelength dependence of the total transmittance (TT) and polarization efficiency (PE) of the sample according to Example 9. At 550 nm, TT=38.7%, PE=99.8%. Averaged over the spectral range of 400 nm-700 nm, TT=38.6%, PE=99.5%.

Linear Polarizer

A linear polarizer layer according to first embodiment, the second embodiment, or the third embodiment, may be used as linear polarizer in a display such as a liquid crystal display. The birefringent aromatic polymer and cationic dye forms a layer that polarizers light.

Figure 14:
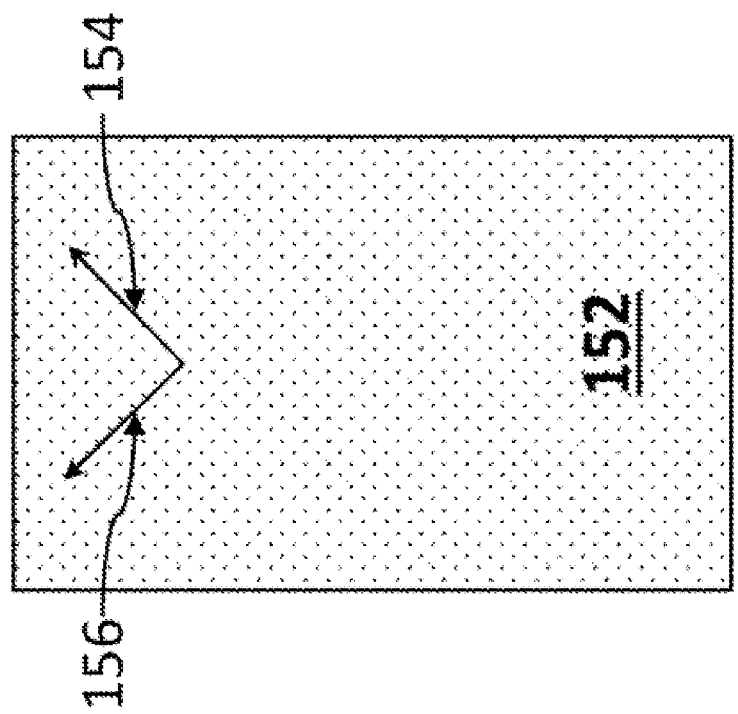
FIG. 14 is a schematic top view of an illustrative retarder.
Figure 15:
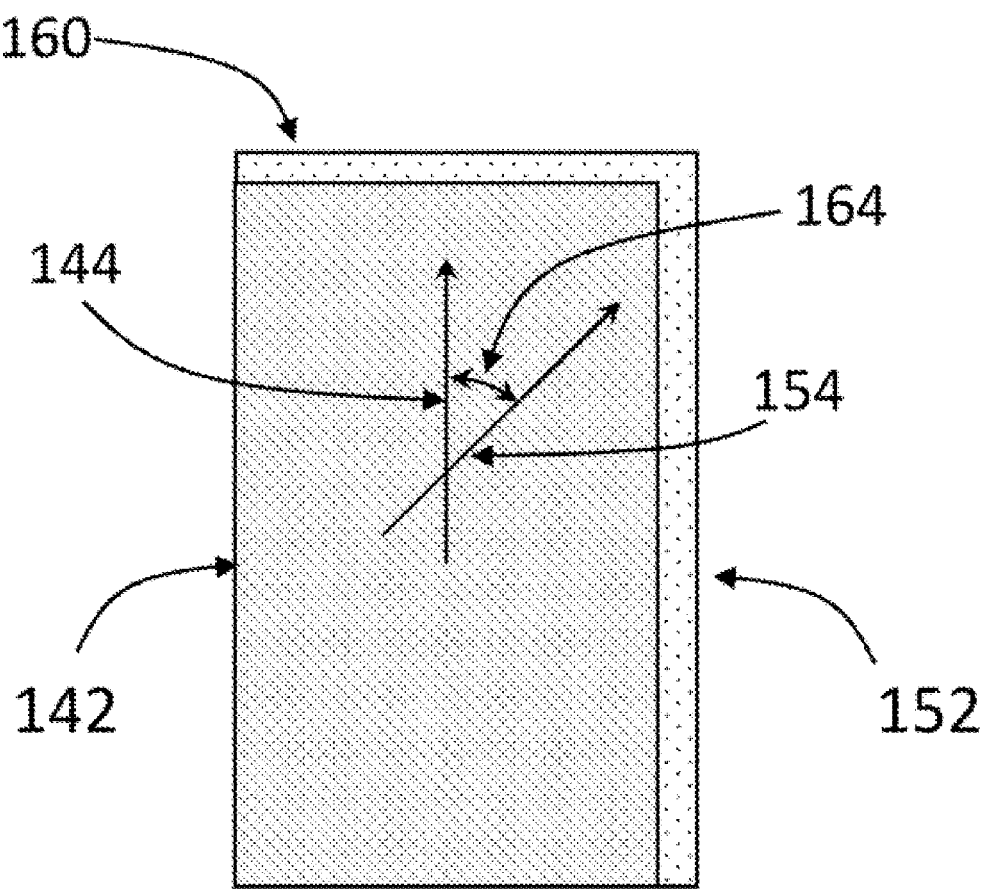
FIG. 15 is a top view of an illustrative optical article.
Figure 16:
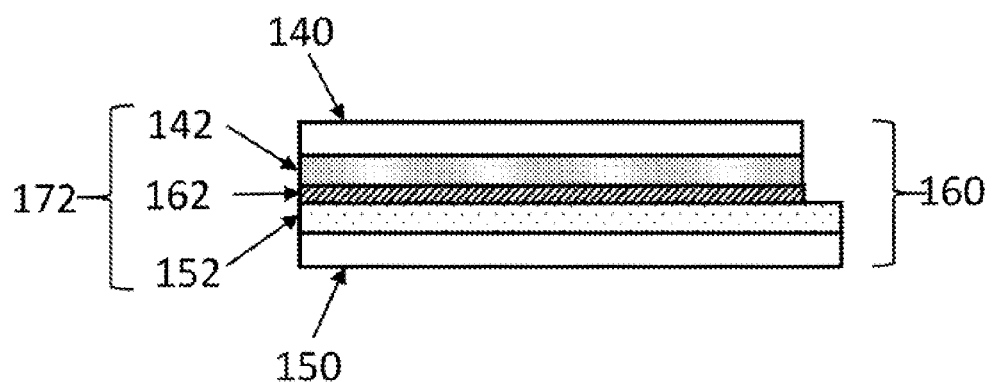
FIG. 16 is a side view of an illustrative optical article.

For example, a circular polarizer can be formed from a suitable combination of linear polarizer layer and a quarter-wave retarder layer. FIG. 15 and FIG. 16 are schematic top and side view of an illustrative optical article 160. Optical article 160 includes a linear polarizer layer 142, a retarder layer 152, optionally a substrate layer 140 on which the linear polarizer layer 142 was formed, and optionally a substrate 150 on which the retarder layer 152 was formed. As discussed, the linear polarizer layer is preferably 3.0 micrometers or less in thickness, and the retarder layer is preferably 3.0 micrometers or less in thickness. The retarder layer can be configured as a quarter-wave retarder, preferably exhibiting an in-plane retardation in a range of 110 nm to 175 nm at wavelength of 550 nm, or more preferably exhibiting an in-plane retardation in a range of 130 nm to 145 nm at a wavelength of 550 nm. Linear polarizer layer 142 and retarder layer 152 overlap to form a stack. The retarder layer 152 includes a first birefringent aromatic polymer generally aligned along a direction 154 (shear-coating direction of the first birefringent aromatic polymer), and the linear polarizer layer 142 includes a second birefringent aromatic polymer generally aligned along in-plane direction 144 (shear-coating direction of the second birefringent aromatic polymer) (FIG. 14). In order to obtain a circular polarizer, the retarder layer 152 and the linear polarizer 142 are oriented relative to each other such that an angle 164 between direction 154 and the in-plane direction 144 is in a range of 40° to 50°, and preferably in a range of 43° to 47°. In the case of an ideal quarter-wave retarder, the angle 164 would ideally be 45°.

The optical article 160 additionally includes an intermediate layer 162 interposed between the retarder layer 152 and the linear polarizer layer 142. The intermediate layer limits ion diffusion between the linear polarizer layer 142 and the retarder layer 152. The intermediate layer is preferably 100 μm in thickness or less. For example, the intermediate layer 162 acts as a barrier for the diffusion of iodine anions from the linear polarizer layer 142 to the retarder layer 152. Additionally, the intermediate layer 162 can include an adhesive, such as an acrylic optically clear adhesive (OCA). In this case, the intermediate layer can be used to laminate the linear polarizer (consisting of the linear polarizer layer 142 on substrate layer 140) and the retarder (consisting of the retarder layer 152 on substrate 150) together. The overlapped stack of the retarder layer 152, the linear polarizer layer 142, and the intermediate layer 162 interposed between them can be referred to as a circular polarizer stack 172 when the retarder is configured as a quarter-wave retarder and the retarder layer 152 and the linear polarizer 142 are oriented relative to each other at the angle 164 as described above.

Figure 17:
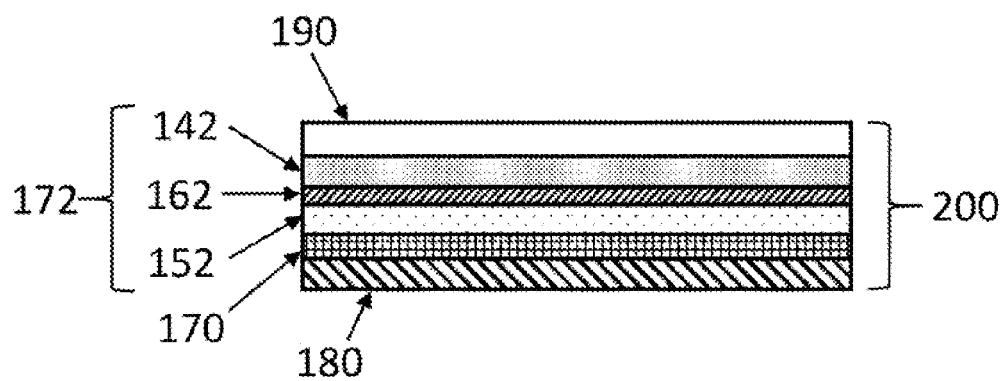
FIG. 17 is a schematic side view of another illustrative optical article.

FIG. 17 is a schematic side view of another illustrative optical article 200. Optical article 200 includes an over-lapped stack of the following items, ordered by proximity to a viewer: an outer substrate 190 (closest to viewer), a linear polarizer layer 142, an intermediate layer 162 interposed between the linear polarizer layer 142 and the retarder 152, a retarder layer 152, a touch sensor layer 170, and an organic light-emitting diode (OLED) display panel 180 (farthest from viewer). The circular polarizer stack 172 consisting of the linear polarizer layer 142, intermediate layer 162, and the retarder layer 152, is as described above. OLED display panel 180 is configured to emit light toward the circular polarizer stack 172. A circular polarizer stack (172) positioned in front of the OLED display panel 180 can reduce reflection of ambient light (light entering from the ambient into optical article 200 through outer substrate 190 towards OLED display panel 180) from the OLED display panel 180 back toward the viewer. In the case of optical article 200, the retarder layer 152, the intermediate layer 162, and the linear polarizer 142, can be sequentially formed on top of an existing panel or substrate consisting of an OLED display and a touch sensor layer.

The disclosure relates to, a method of forming a linear polarizer, comprising the steps of: shear-coating a liquid crystal solution comprising a birefringent aromatic polymer on a substrate to form a polymeric birefringent coating layer, the polymeric birefringent coating layer being 3.0 micrometers or less in thickness; and treating the polymeric birefringent coating layer with a staining or passivation solution or combination of those comprising at least one of the following: cationic dye or combination of such dyes, iodine anions, multi-valent cations to form a linear polarizer layer.

This method may additionally comprise the step of removing excess of staining or passivation solution from the linear polarizer layer. This method may additionally comprise the step of removing excess of staining or passivation solution that comprises treating the linear polarizer layer with a rinse solution. The rinse solution may comprise ethanol. Alternatively, the step of removing excess staining or passivation solution comprises spin-drying the linear polarizer layer.

The method of any one or more of the preceding two paragraphs, wherein the staining-passivation solution additionally comprises cations selected from the group consisting of: $K^+$, $NH_4^+$, $Li^+$, $Na^+$, and $Cs^+$.

The method of one or more of the preceding three paragraphs, wherein the multi-valent cations are selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ni^{2+}$, $Co^{2+}$, and $Sn^{2+}$.

The method of any one or more of the preceding four paragraphs, wherein the polymeric lyotropic liquid crystal solution is substantially free of poly(vinyl alcohol).

The method of any one or more of the preceding five paragraphs, wherein the birefringent aromatic polymer is of a structure:

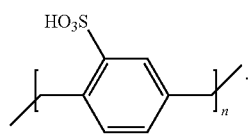

(A)

or a salt thereof, wherein n is an integer in a range from 25 to 10,000.

The method of any one or more of the preceding six paragraphs, wherein the birefringent aromatic polymer is of a structure:

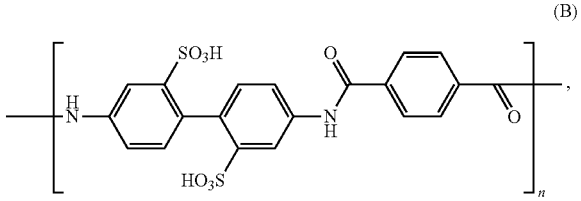

(B)

or a salt thereof, wherein n is an integer in a range from 20 to 20,000.

The method of any one or more of the preceding seven paragraphs, wherein the birefringent aromatic polymer comprises a group ($SO^{3-}M^+$), and M is selected from the group consisting of Na, K, Cs, and $NH_4$.

The method of any one or more of the preceding eight paragraphs, wherein the polymeric lyotropic liquid crystal solution comprises water.

The method of any one or more of the preceding nine paragraphs, wherein the polymeric birefringent coating layer is 3.0 micrometers or less in thickness.

The method of any one or more of the preceding ten paragraphs, wherein the polymeric birefringent coating layer is substantially non-absorbing in the visible spectral range.

The method of any one or more of the preceding eleven paragraphs, wherein: the polymeric lyotropic liquid crystal solution comprises water; the birefringent aromatic polymer is a sodium salt of a structure:

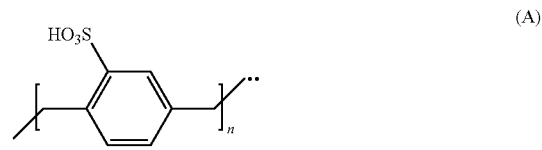

(A)

wherein n is an integer in a range from 25 to 10,000; the polymeric birefringent coating layer is 3.0 micrometers or less in thickness; the multi-valent cations are selected from $Sr^{2+}$ and $Al^{3+}$. The disclosure relates to, a linear polarizer, comprising: a polymeric birefringent coating layer of 3.0 micrometers or less in thickness, comprising a birefringent aromatic polymer and cationic dyes.

The polymeric birefringent coating layer of the preceding paragraph may comprise multi-valent cations selected from the group consisting of: $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ni^{2+}$, $Co^{2+}$, and $Sn^{2+}$.

The linear polarizer of any one or more of the preceding two paragraphs, wherein the polymeric birefringent coating layer is substantially free of poly(vinyl alcohol).

The linear polarizer of any one or more of the preceding three paragraphs, wherein the birefringent aromatic polymer is of a structure:

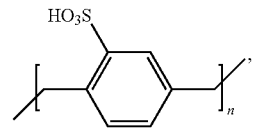

or a salt thereof, wherein n is an integer in a range from 25 to 10,000.

The linear polarizer of any one or more of the preceding four paragraphs, wherein the birefringent aromatic polymer is of a structure.

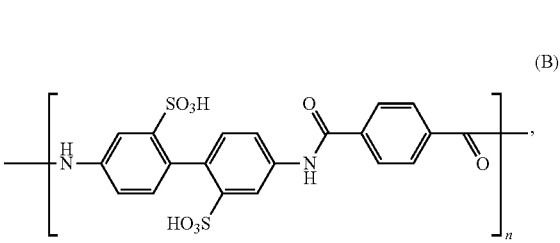

(B)

or a salt thereof, wherein n is an integer in a range from 20 to 20,000.

The linear polarizer of any one or more of the preceding five paragraphs, wherein the birefringent aromatic polymer comprises a group ($SO^{3-}$).

The linear polarizer of any one or more of the preceding six paragraphs, wherein the birefringent aromatic polymer is capable of forming a lyotropic liquid crystal solution.

The linear polarizer of any one or more of the preceding seven paragraphs, wherein the polymeric birefringent coating layer is 3.0 micrometers or less in thickness.

The linear polarizer of any one or more of the preceding eight paragraphs, wherein the polymeric birefringent coating layer has a total transmittance, averaged over 400 nm to 700 nm, of 40% or greater, and a polarization efficiency, averaged over 400 nm to 700 nm, of 95% or greater.

The linear polarizer of any one or more of the preceding nine paragraphs, wherein the polymeric birefringent coating layer has a dichroic ratio, averaged over 400 nm to 700 nm, of 17 or greater.

The linear polarizer of any one or more of the preceding ten paragraphs, wherein: the birefringent aromatic polymer is a sodium salt of a structure:

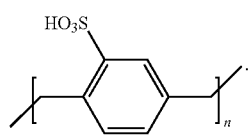

(A)

wherein n is an integer in a range from 25 to 10,000; and the multi-valent cations are selected from $Al^{3+}$ and $Sr^{2+}$.

A display comprising the linear polarizer of any one or more of the preceding eleven paragraphs.

A circular polarizer comprising the linear polarizer of any one or more of the preceding twelve paragraphs and a quarter-wave retarder.

A display comprising the circular polarizer of the preceding paragraph.

The disclosure relates to, an optical article, comprising: an optical retarder layer of 3.0 micrometers or less in thickness, comprising a first birefringent aromatic polymer, the first birefringent aromatic polymer being generally aligned along a first alignment direction; and a linear polarizer layer of 3.0 micrometers or less in thickness, comprising a second birefringent aromatic polymer and at least one cationic dye, the second birefringent aromatic polymer being generally aligned along a second alignment direction; an intermediate layer between the linear polarizer layer and the optical retarder layer to limit ion diffusion between the linear polarizer layer and the optical retarder layer; wherein an angle between the first alignment direction and the second alignment direction is in a range of 40° to 50°.

The optical article of the preceding paragraph, wherein the optical retarder layer has an in-plane retardation in a range of 110 nm to 175 nm at a wavelength of 550 nm. The in-plane retardation may be in a range of 130 nm to 145 nm at a wavelength of 550 nm.

The optical article of any one or more of the preceding two paragraphs, wherein the optical retarder is configured as a quarter-wave retarder.

The optical article of any one or more of the preceding three paragraphs, wherein the first birefringent aromatic polymer and the second birefringent aromatic polymer have identical structure.

The optical article of any one or more of the preceding four paragraphs, wherein the intermediate layer comprises an adhesive.

The optical article of any one or more of the preceding five paragraphs, additionally comprising a touch sensor layer, the optical retarder layer being positioned between the touch sensor layer and the linear polarizer layer.

The optical article of any one or more of the preceding six paragraphs, additionally comprising an organic light-emitting diode (OLED) panel, the optical retarder layer being positioned between the OLED panel and the linear polarizer layer.

The disclosure relates to, a linear polarizer comprising, a linear polarizer layer comprising an anionic birefringent polymer, a cationic dye, and optionally a plurality of multi-valent cations; and a substrate.

The linear polarizer of the preceding paragraph, wherein the linear polarizer layer comprises iodine anions.

The linear polarizer of any of the preceding two paragraphs, wherein at least one cationic dye is selected from the group consisting of dye C, dye D, dye E, dye F, dye G, dye H, dye K, and dye L.

The linear polarizer of any of the preceding three paragraphs, wherein the plurality of multi-valent cations are selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ni^{2+}$, $Co^{2+}$, and $Sn^{2+}$.

The linear polarizer of any of the preceding four paragraphs, wherein the anionic birefringent polymer is selected from

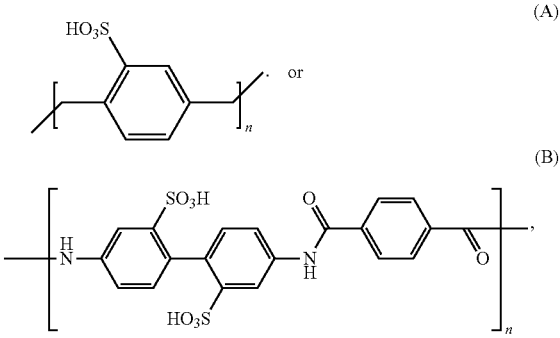

where n is an integer from 20 to 20,000.

The linear polarizer of the preceding paragraph, wherein birefringent polymer is (A) and n is an integer from 25 to 10,000.

The linear polarizer of the preceding two paragraphs, wherein the anionic birefringent polymer is (B) and n is an integer from 20 to 20,000.

The linear polarizer of any of the preceding seven paragraphs, wherein the linear polarizer layer has a thickness of 3.0 micrometers or less.

The disclosure relates to, a method for forming a linear polarizer comprising, shear-coating a liquid crystal solution on a substrate giving a polymeric coating layer, the liquid crystal solution comprising an anionic birefringent polymer and at least one cationic dye and applying a passivation solution to the polymeric coating layer giving a linear polarizer layer.

The method of the preceding paragraph, wherein the linear polarizer layer has a thickness of 3.0 micrometers or less.

The method of any of the two preceding paragraphs, wherein the linear polarizer layer has a thickness of 0.5 to 1.5 micrometers.

The method of any of the three preceding paragraphs, wherein the at least on cationic dye is selected form the group consisting of dye C, dye D, dye E, dye F, dye G, dye H, dye K, and dye L.

The method of any of the four preceding paragraphs, wherein the passivation solution comprises a plurality of multi-valent cations.

The method of the preceding paragraph, wherein the plurality of multi-valent cations are selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

The method of any of the six preceding paragraphs, wherein the at least on cationic dye comprises at least two cationic dyes.

The method of any of the seven preceding paragraphs, wherein the at least on cationic dye comprises at least three cationic dyes selected to from a grey or colorless polarizer.

The disclosure relates to, a method for forming a linear polarizer comprising, shear-coating a liquid crystal solution on a substrate giving a polymeric coating layer, the liquid crystal solution comprising an anionic birefringent polymer and applying a staining solution to the polymeric coating layer giving a linear polarizer layer, the staining solution comprising at least one cationic dye.

The method of the preceding paragraph, wherein the linear polarizer layer has a thickness of 0.5 to 1.5 micrometers.

The method of any of the two preceding paragraphs, wherein the at least on cationic dye is selected form the group consisting of dye C, dye D, dye E, dye F, dye G, dye H, dye K, and dye L.

The method of any of the three preceding paragraphs, further applying a passivation solution to the linear polarizer layer, the passivation solution comprises a plurality of multi-valent cations.

The method of the preceding paragraph, wherein the plurality of multi-valent cations are selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

The method of any of the five preceding paragraphs, wherein the at least on cationic dye comprises at least two cationic dyes.

The method of any of the six preceding paragraphs, wherein the at least on cationic dye comprises at least three cationic dyes selected to from a grey or colorless polarizer.

The disclosure relates to, a method for forming a linear polarizer comprising, shear-coating a liquid crystal solution on a substrate giving a polymeric coating layer, the liquid crystal solution comprising an anionic birefringent polymer and at least one cationic dye and applying a staining-passivation solution to the polymeric coating layer giving a linear polarizer layer, the staining-passivation solution comprising a plurality of iodide ions and a plurality of multi-valent cations.

The method of the preceding paragraph, wherein the linear polarizer layer has a thickness of 0.5 to 3.5 micrometers.

The method of any of the two preceding paragraphs, wherein the at least on cationic dye is selected form the group consisting of dye C, dye D, dye E, dye F, dye G, dye H, dye K, and dye L.

The method of any of the three preceding paragraphs, wherein the plurality of multi-valent cations are selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

The method of any of the four preceding paragraphs, wherein the at least on cationic dye comprises at least two cationic dyes.

The method of any of the five preceding paragraphs, wherein the at least on cationic dye comprises at least three cationic dyes selected to from a grey or colorless polarizer.

The disclosure relates to, an optical article comprising, an optical retarder layer that has a thickness of 3.0 micrometers or less, comprising a first birefringent aromatic polymer, the first birefringent aromatic polymer being generally aligned along a first alignment direction, a linear polarizer layer that has a thickness of 3.0 micrometers or less, comprising a second birefringent aromatic polymer and at least one cationic dye, the second birefringent aromatic polymer being aligned along a second alignment direction and an intermediate layer between the linear polarizer layer and the optical retarder layer to limit ion diffusion between the linear polarizer layer and the optical retarder layer, wherein an angle between the first alignment direction and the second alignment direction is 40° to 50°.

The optical article of the preceding paragraph, wherein the optical retarder layer has an in-plane retardation in a range of 110 nm to 175 nm at a wavelength of 550 nm. The in-plane retardation may be in a range of 130 nm to 145 nm at a wavelength of 550 nm.

The optical article of any of the two preceding paragraphs, wherein the optical retarder layer is configured as a quarter-wave retarder.

The optical article of any of the three preceding paragraphs, wherein the first birefringent aromatic polymer and the second birefringent aromatic polymer have identical structure.

The optical article of any of the four preceding paragraphs, wherein the intermediate layer comprises an adhesive.

The optical article of any of the six preceding paragraphs, further comprising a touch sensor layer, the optical retarder layer being positioned between the touch sensor layer and the linear polarizer layer.

The optical article of any of the seven preceding paragraphs, further comprising an organic light-emitting diode panel, the optical retarder layer being positioned between the organic light-emitting diode panel and the linear polarizer layer.

EXAMPLES

Example 1

Birefringent Aromatic Polymer of Structure (A)

In Example 1, the synthesis of a birefringent aromatic polymer of structure (A), sodium salt, or poly(monosulfo-p-xylene), sodium salt, is described. The reaction scheme is as follows:

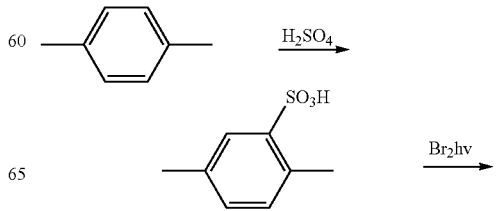

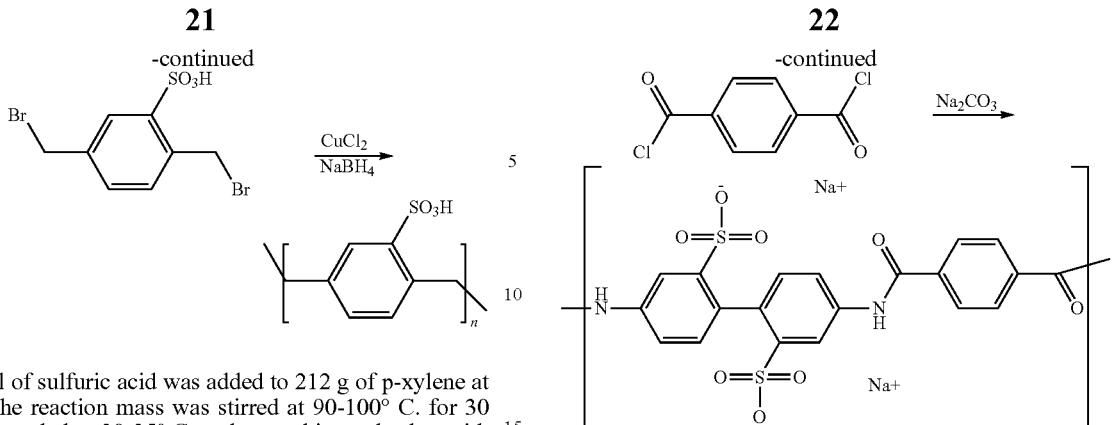

300 ml of sulfuric acid was added to 212 g of p-xylene at 90° C. The reaction mass was stirred at 90-100° C. for 30 min then cooled to 20-25° C. and poured into a beaker with 500 g of mixture of water and ice. The resulting suspension was separated by filtration and the filter cake rinsed with cool (5° C.) solution of 300 ml of hydrochloric acid in 150 ml of water.

The material was vacuum dried at 50 mbar and 50° C. for 24 hrs. Yield of 2,5-dimethylbenzene-sulfonic acid is 383 g (contained 15% water). 92.6 g of 2,5-dimethylbenzenesulfonic acid was added to 1700 ml of chloroform and the mixture was purged with argon gas. The mixture was heated to boiling with a 500 W lamp placed right against the reaction flask so that the stirred contents of the flask is well lit. 41 ml bromine in 210 ml of chloroform was added dropwise within 4-5 hrs to the agitated boiling mixture. Once all bromine has been added the light exposure with refluxing is continued for an extra hour. 900 ml of chloroform was distilled and the reaction mass is allowed to cool overnight. Precipitated material was isolated by filtration, the filter cake rinsed with 100 ml of chloroform and recrystallized from 80 ml of acetonitrile. Yield of 2,5-bis(bromomethyl)benzenesulfonic acid is 21 g.

4.0 g of sodium borohydride in 20 ml of water was added to a stirred mixture of 340 mg of CuCl2, 10.0 g of 2,5-bis (bromomethyl)benzenesulfonic acid, 10.4 g of sodium bromide, 45 ml of amyl alcohol and 160 ml of degassed water and the reaction mass was agitated for 10 min. Then the mixture was transferred to a 1-liter separatory funnel, 300 ml of water was added and after shaking the mixture was allowed to stand for an hour. The bottom layer was isolated, clarified by filtration and ultrafiltered using a polysulfone membrane with 10,000 molecular weight cut-off. The Birefringent Aromatic Polymer of Structure (A) is in the form of water solution, sodium salt with solid content of 16-20%. Yield was 4.0 g (on dry basis).

Example 2

Birefringent Aromatic Polymer of Structure (B)

In Example 2, the synthesis of a birefringent aromatic polymer of structure (B), sodium salt, or poly(2,2'-disulfo-4,4'-benzidine terephthalamide), sodium salt, is described. The reaction scheme is as follows:

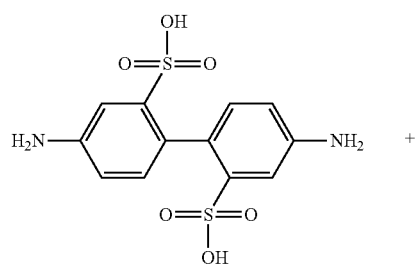

10.0 g (0.029 mol) of 4,4'-Diaminobiphenyl-2,2'-disulfonic acid was mixed with 3.1 g (0.029 mol) of sodium carbonate and 700 ml of water and stirred until dissolution. While stirring the obtained solution, a solution of 6.5 g (0.032 mol) of terephthaloyl chloride in 700 ml of toluene was added followed by a solution of 6.1 g of sodium carbonate in 100 g of water. The stirring was continued for 3 hours. The emulsion was heated to boiling and the toluene distilled out. The resulting water solution was ultrafiltered using PES membrane with MW cut-off 20K Dalton. Yield of the polymer is 180 g of 8% water solution.

Gel permeation chromatography (GPC) analysis of the sample was performed with Hewlett Packard 1260 chromatograph with diode array detector ($\lambda$=230 nm), using Varian GPC software Cirrus 3.2 and TOSOH Bioscience TSKgel G5000 PWXL column and 0.2 M phosphate buffer (pH=7) as the mobile phase. Poly(para-styrenesulfonic acid) sodium salt was used as GPC standard. The calculated number average molecular weight Mn, weight average molecular weight Mw, and polydispersity PD was found to be $1.1 \times 10^5$, $4.6 \times 10^5$, and 4.2 respectively.

Example 3

Yellow Cationic Dye (C)

4.0 g 2-(4-Aminophenyl)Benzothiazole was added to 30 ml chloroform and 2.0 g magnesium oxide and the mixture was heated to 50° C. 7 ml dimethylsulfate was added, and the mixture was heated to reflux and agitated at temperature for 7 hrs. After cooling to room temperature 35 ml of toluene was added and the crude product was isolated by filtration. The filter cake was washed with 70 ml toluene and dried on filter. This product was dissolved in 100 ml methanol and filtered; the filter cake was rinsed with 20 ml methanol. The combined filtrate and rinse methanol was evaporated to result in 3.3 g of dye C.

Example 4

Red Cationic Dye (G)

2.0 g 4,4'-diaminostylbene dihydrochloride was dissolved in 70 ml water and 4.6 g 28% hydrochloric acid. The solution was cooled to 0-2° C. and a solution of 1.05 g of sodium nitrite in 5 g water was added within 2 min. The resulting reaction mass was agitated at 0-2° C. until diazotization was over. A few drops of 10% sulfamic acid in water was added until excessive nitric acid was removed. A solution of 1.0 g imidazole in 4 ml water was added followed by 40% sodium hydroxide in water until pH of the reaction mass reached 8. Then the mass was agitated for 3 hrs at 5-10° C. and filtered. The filter cake was washed with 500 ml water and vacuum dried at 10 mmHg and 50° C. for 36 hrs.

The dried material was mixed with 45 ml chloroform and 1.5 g magnesium oxide and the mixture was heated to 50° C. Then 9.2 ml dimethylsulfate is added; the mixture was heated to reflux and was kept at temperature for 5 hrs. Then it was cooled to room temperature, filtered, the filter cake was washed with 40 ml chloroform and dried on filter. The filter cake was dissolved in 300 ml methanol, clarified through a 1 µm glass fiber filter and the methanol solution evaporated. The resulting material was purified using column chromatography (Silica Gel 60, methanol-water-acetic acid=5-5-2 by volume). Yield was 1.5 g.

Example 5

Violet Cationic Dye (K)

9.9 g disperse red 19 was mixed with 23 ml 95% ethanol and 10 g water and heated to 50° C. A solution of 8.0 g sodium sulfide nonahydrate in 12 g water was added; the resulting mixture was heated to boiling at ~80° C. and kept at temperature for 4 hrs. Then it was cooled, filtered and the filter cake was washed with 150 ml water and pressed to squeeze out most of the rinse water.

The wet filter cake was dissolved in 160 ml water and 15 g 7M hydrochloric acid at 50° C. and the solution was then cooled to 30° C. 70 g of crushed ice was added to bring the temperature of the solution to 0-2° C. A chilled solution of 2.14 g sodium nitrite in 6 g water was added dropwise within 15 min with good agitation and the resulting reaction mass was agitated until diazotization was over. A chilled solution of 3.4 g imidazole in 30 g water is added and the reaction is agitated for 30 min at 0-2° C. Then the reaction mass is slowly neutralized with 40% sodium hydroxide until pH reaches 8 at ~5° C. Then the reaction was agitated overnight while the temperature was allowed to slowly increase to ~15° C. The product was isolated by filtration and rinsed with 1 L water. The filter cake was dried until the weight ceases to change. 9 g of the intermediate is obtained.

9 g of the intermediate from the previous stage is mixed with 80 ml of chloroform and 1.1 g of MgO and heated with agitation to ~50° C. 8 g of dimethylsulfate is added; the temperature was brought to 58-60° C. the reaction mass is agitated for 3 hrs. Then the reaction was allowed to cool and filtered. The filter cake was agitated with 100 ml chloroform, filtered, rinsed with 20 ml chloroform and dried on filter. Then the filter cake was dissolved in 200 ml methanol and clarified through a 1 µm glass fiber filter. Then methanol was evaporated resulting in 10 g of crude product, which was purified by column chromatography (Silica Gel 60, Methanol-Water-Acetic Acid=5-5-2 by volume). Yield was 5 g.

Example 6

Orange Cationic Dye (L)

A mixture of 60 g propanol-2, 15 g water, 35 g 85% orthophosphoric acid and 10 g terephthalic aldehyde was heated with agitation to 65° C. 26 g of 2-methylene-1,3,3-trimethylindoline was added to result in highly exothermic reaction that brought the mixture to boil. Agitation at reflux continued for 3 hrs, then the reaction mass was cooled to room temperature and the product was isolated by filtration. The filter cake was washed with propanol-2 and dried at 55° C. Yield was 40 g.

Example 7

Details of the procedures for preparing coated samples according to the first embodiment are given in this Example 7.

A cellulose triacetate (TAC) film (80 µm thick) was used as the base for the coatable substrate. The coatable substrate was prepared by coating TAC film with a primer solution to improve adhesion of the coating. In this case, the primer solution was Michelman P2300 primer diluted to 0.5% in water. The primer solution was filtered through a 0.45 µm Nylon filter and coated on the TAC film using a Mayer rod #2. The designation #2 refers to the diameter of the wire on the Mayer rod in mils. The coatable substrate was then dried in an oven at 60° C. for 5 minutes and was now ready for coating with the coating solution.

A coating solution is prepared by mixing the polymer of Example 1 as water solution and the yellow cationic dye of Example 3, the red cationic dye of Example 4, the violet cationic dye of Example 5, Basic Blue 9, and water so that the total solid content was equal to 14%, while the weight ratio between the polymer and the sum of the dyes was 100:5 and the weights ratio between the respective dyes is 5/7/5/4. The coating solution was coated on the coatable substrate using Mayer rod #15, and the resulting coated substrate was dried in an oven at 60° C. for 2 minutes. Thickness of the resulting polymeric birefringent coating layer is approximately 2.5 µm.

The passivation solution was a solution containing passivation constituents. The passivation solution is prepared as follows. The passivation constituent, $SrCl_2$ (10 weight parts) was added to 100 weight parts of water and the mixture was stirred for 10 minutes with no heating.

The coated substrate was dipped in the passivation solution for 3 seconds. The coated substrate was then dipped in a rinse water for 5 seconds. The passivated coated substrate was dried in an oven at 60° C. for 5 minutes.

Optical measurements conducted on the Example 7 sample are reported in FIG. 7 and FIG. 8. The optical measurement were performed using Shimadzu UV-2600 spectrophotometer equipped with a Glan polarizer in the signal beam. The spectrophotometer measured Tper and Tpar, and TT, PE values were calculated therefrom according to the formulae TT=(Tper+Tpar)/2, PE=100%×(Tpar−Tper)/(Tpar+Tper).

Example 8

Details of the procedures for preparing coated samples according to the second embodiment are given in this Example 8.

The coatable substrate is prepared as described in Example 7.

The concentration of the Example 1 birefringent aromatic polymer solution was adjusted to 16%. The polymeric solution is coated on the coatable substrate using Mayer rod #4, and the resulting coated substrate was dried in an oven at 60° C. for 5 minutes. Thickness of the resulting polymeric birefringent coating layer was approximately 0.8 µm.

A staining solution was prepared by mixing glacial acetic acid, sodium acetate, the Example 4 red cationic dye, and water so that the dye content was equal to 0.1%, acetic acid content was 20%, sodium acetate content was 10%.

The coated substrate was dipped in the staining solution for 3 min. The coated substrate was then dipped in Ethyl alcohol for 3 seconds. The doped coated substrate was dried in an oven at 60° C. for 5 minutes.

Optical measurements conducted on the Example 8 sample are reported in FIG. 9, and FIG. 10. The optical measurements were performed as described in Example 7.

Example 9

Details of the procedures for preparing coated samples according to the third embodiment are given in this Example 9.

The coatable substrate was prepared as described in Example 7. A coating solution was prepared by mixing the Example 1 polymer as water solution and the Cationic Dye (L) so that the total solids content was equal to 14%, while the weight ratio between the polymer and the dye was 100:2. The coating solution was coated on the coatable substrate using Mayer rod #4, and the resulting coated substrate was dried in an oven at 60° C. for 2 minutes. Thickness of the resulting polymeric birefringent coating layer was approximately 0.8 μm.

The staining-passivation solution was a solution containing staining and passivation constituents. The staining constituents were iodine ($I_2$) and iodide salts. In this example, the iodide salt was KI and the passivation constituent was $AlCl_3$. The staining-passivation solution was prepared as follows. Iodine (1 weight part) and KI (10 weight parts) were mixed and dissolved in 100 weight parts of water. The mixture was stirred for 10 minutes with no heating. The passivation constituent, $AlCl_3$ (10 weight parts), was added and mixed for 30 minutes with no heating.

The coated substrate was dipped in the staining-passivation solution for 20 seconds. The coated substrate was then dipped in a rinse solution for 3 seconds. In this example, the rinse solution was Ethanol. Excess liquid was blown off of the coated substrate using compressed air. The coated substrate was dried in an oven at 60° C. for 5 minutes.

Optical measurements conducted on the Example 9 sample are reported in FIG. 11 and FIG. 12. The optical measurements were performed as described in Example 7.

Example 10

Example 10 describes the methods to prepare the cationic dyes of Examples 3-6 for characterization.

A cellulose triacetate (TAC) film (80 μm thick) was used as the base for the coatable substrate. The coatable substrate is prepared by coating TAC film with a primer solution to improve adhesion of the coating. In this case, the primer solution is Michelman P2300 primer diluted to 0.5% in water. The primer solution was filtered through a 0.45 μm Nylon filter and coated on the TAC film using a Mayer rod #2. The designation #2 refers to the diameter of the wire on the Mayer rod in mils. The coatable substrate was then dried in an oven at 60° C. for 5 minutes and is now ready for coating with the coating solution.

A coating solution is prepared by mixing the Example 1 polymer as water solution with cationic dye from Examples 3-7, and water so that the total solids content is equal to 16%, while the weight ratio between the polymer and the cationic dye was 100:2. The coating solution was coated on the coatable substrate using Mayer rod #4, and the resulting coated substrate was dried in an oven at 60° C. for 2 minutes. Thickness of the resulting polymeric birefringent coating layer was approximately 1.0 μm.

The optical measurement was performed using Shimadzu UV-2600 spectrophotometer equipped with a Glan polarizer in the signal beam. The spectrophotometer measured Tper and Tpar, and TT, PE, KD values were calculated therefrom according to the formulae TT=½(Tmin+Tmax), PE=100 (Tmax−Tmin)/(Tmax+Tmin), KD=ln(Tmin/100)/ln(Tmax/100).

Figure 18:
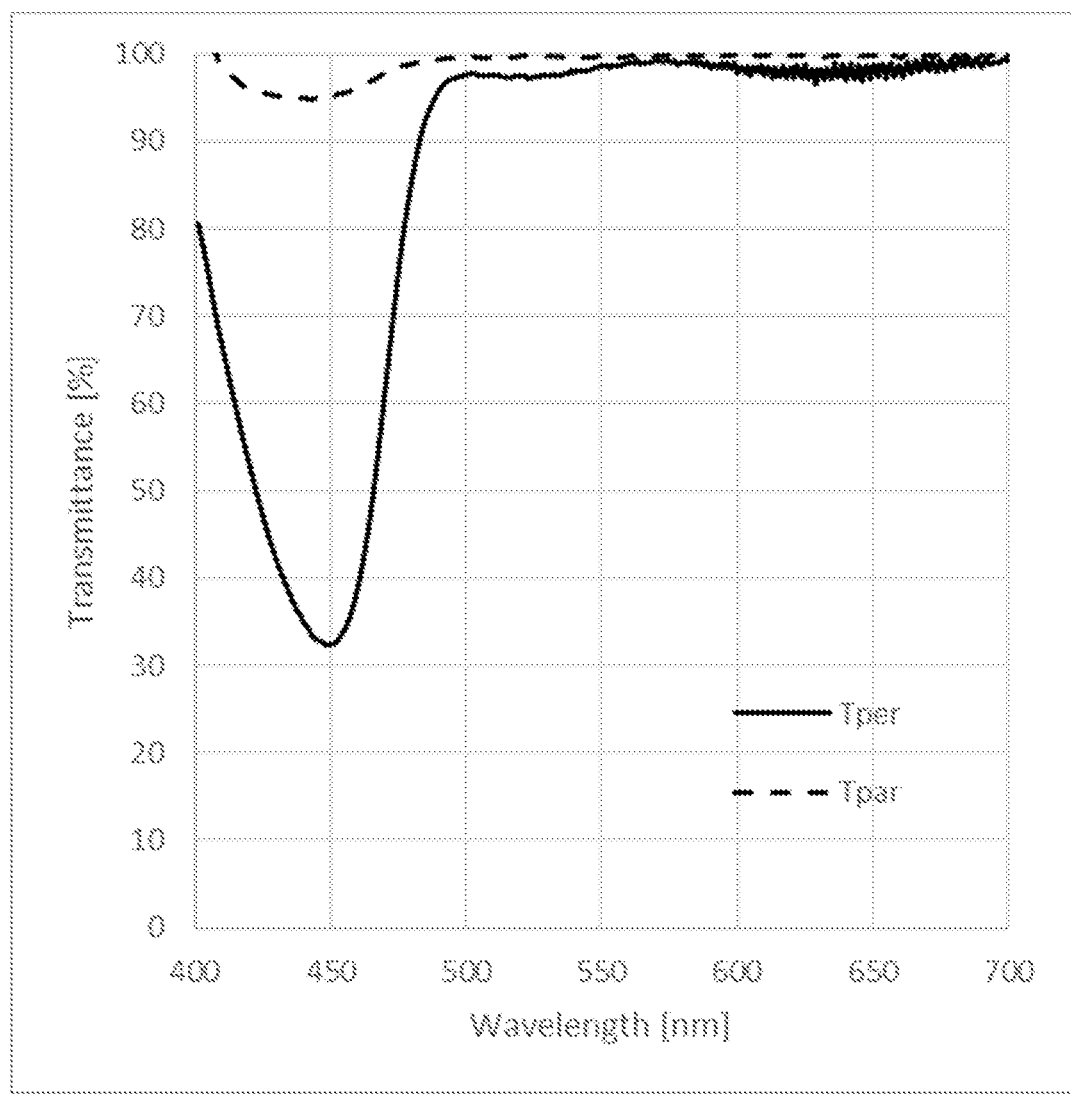
FIG. 18 shows the optical measurements for the cationic dye of Example 3.

FIG. 18 shows the optical measurements for the cationic dye of Example 3.

Figure 19:
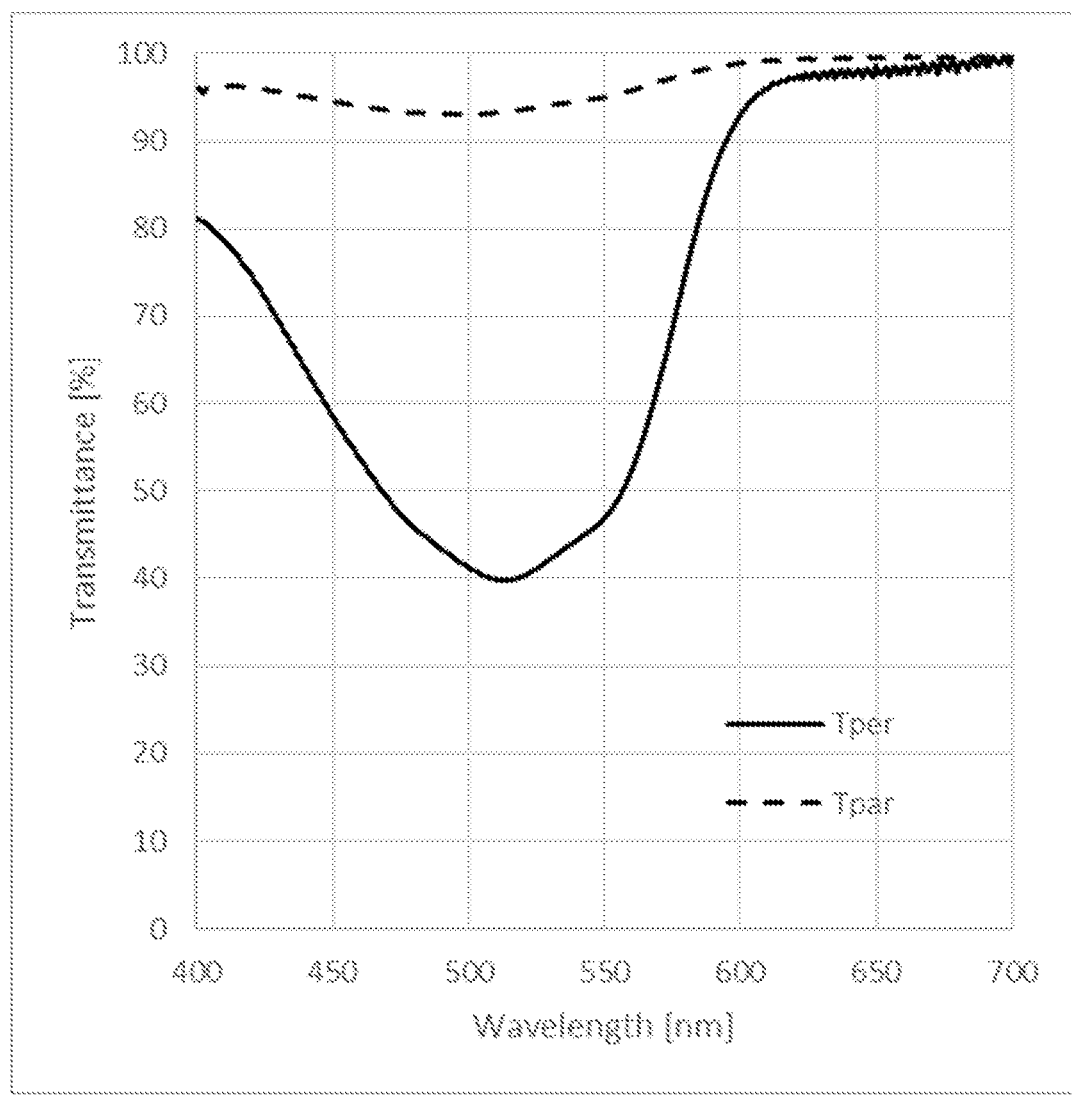
FIG. 19 shows the optical measurements for the cationic dye of Example 4.

FIG. 19 shows the optical measurements for the cationic dye of Example 4.

Figure 20:
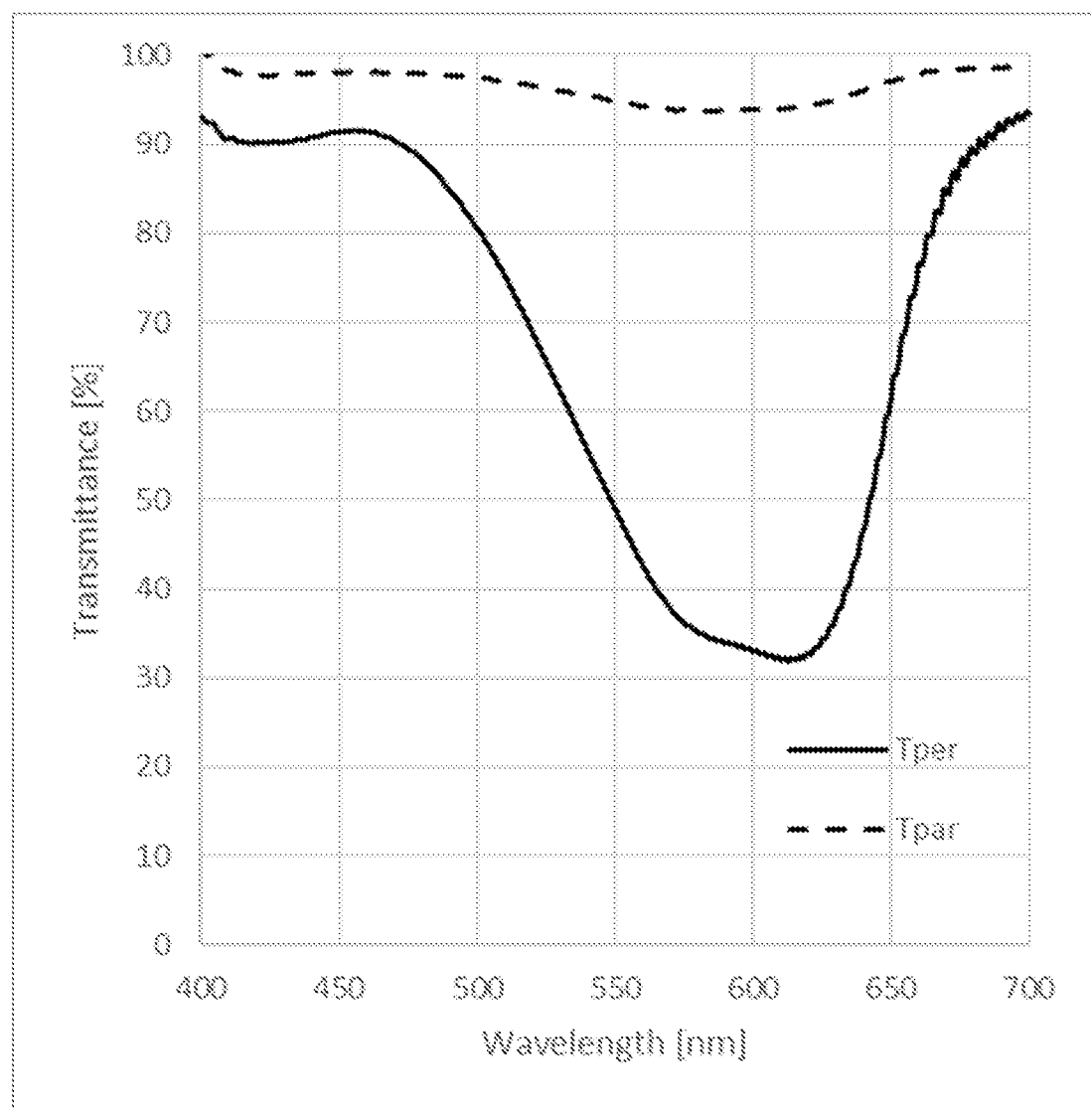
FIG. 20 shows the optical measurements for the cationic dye of Example 5.

FIG. 20 shows the optical measurements for the cationic dye of Example 5.

Figure 21:
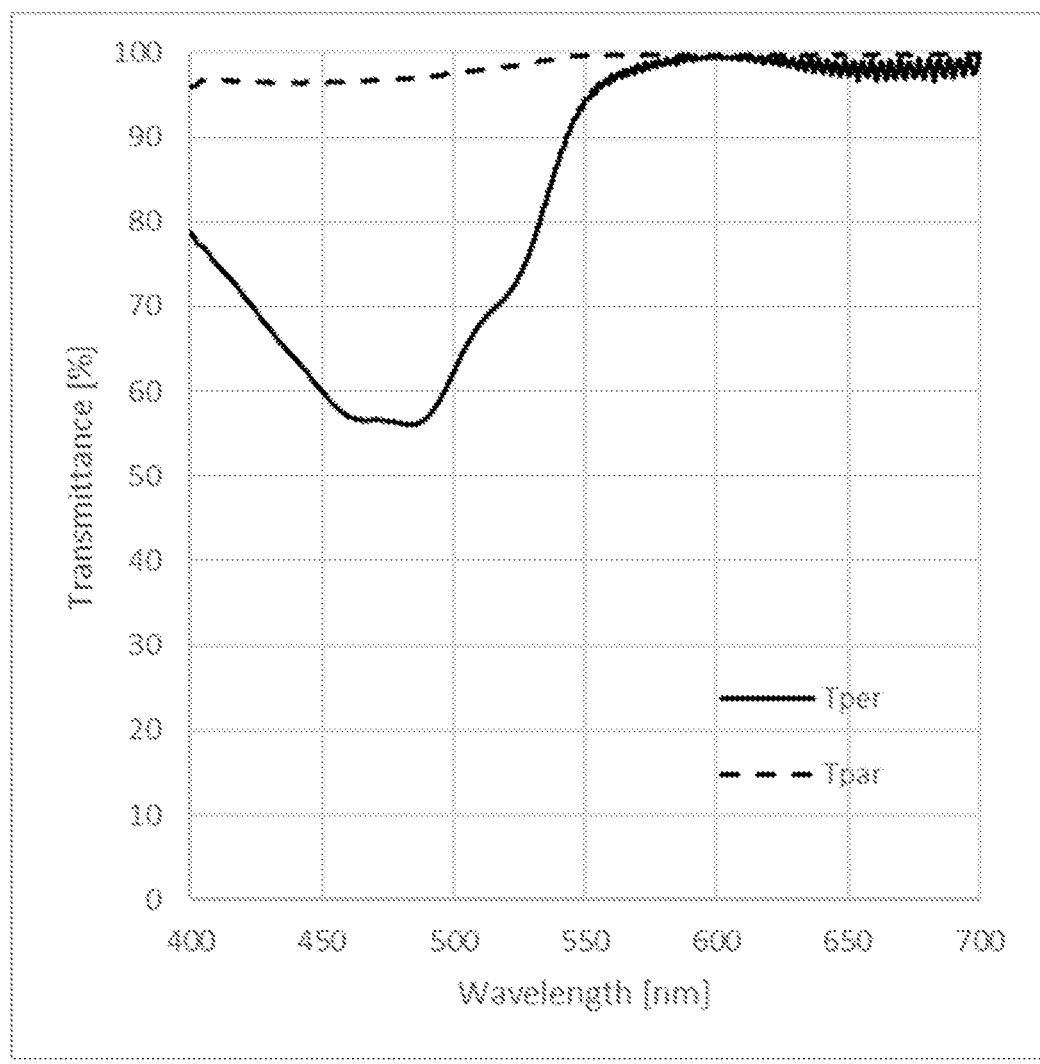
FIG. 21 shows the optical measurements for the cationic dye of Example 6.

FIG. 21 shows the optical measurements for the cationic dye of Example 6.

In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The present disclosure is not limited to the exact details shown and described, for variations obvious to one skilled in the art will be included within the present disclosure defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present disclosure. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present disclosure are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A linear polarizer comprising:
   a linear polarizer layer, wherein the linear polarizer layer is a polymeric layer comprising a birefringent aromatic polymer, wherein the birefringent aromatic polymer is an anionic birefringent polymer, and a cationic dye selected from the group consisting of dye (C), dye (D), dye (E), dye (F), dye (G), dye (H), dye (K), and dye (L); and
   a substrate.

2. The linear polarizer of claim 1, wherein the linear polarizer layer comprises iodine anions and a plurality of multi-valent cations.

3. The linear polarizer of claim 2, wherein the plurality of multi-valent cations is selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

4. The linear polarizer of claim 2, wherein the linear polarizer layer has a thickness of 0.5 to 3.5 micrometers.

5. The linear polarizer of claim 1, wherein the anionic birefringent polymer is selected from

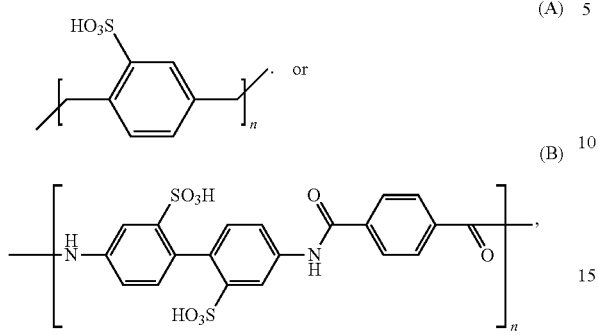

(A)

(B)

where n is an integer from 20 to 20,000.

6. A method for forming a linear polarizer comprising:
shear-coating a liquid crystal solution on a substrate giving a polymeric coating layer, the liquid crystal solution comprising an anionic birefringent polymer and at least one cationic dye selected from the group consisting of dye (C), dye (D), dye (E), dye (F), dye (G), dye (H), dye (K), and dye (L).

7. The method of claim 6, further comprising iodine anions and a plurality of multi-valent cations, wherein the plurality of multi-valent cations are selected from the group consisting of $Ba^{2+}$, $Mg^{2+}$, $Sr^{2+}$, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, $Ca^{2+}$, $Ni^{2+}$, $Co^{2+}$, and $Sn^{2+}$.

8. The method of claim 7, wherein the linear polarizer layer has a thickness of 0.5 to 3.5 micrometers.

9. The method of claim 6, wherein the at least on cationic dye comprises at least two cationic dyes.

10. The method of claim 6, wherein the at least on cationic dye comprises at least three cationic dyes selected to from a grey or colorless polarizer.

11. An optical article comprising:
an optical retarder layer that has a thickness of 3.0 micrometers or less, comprising a first birefringent aromatic polymer, the first birefringent aromatic polymer being generally aligned along a first alignment direction;
a linear polarizer layer that has a thickness of 3.0 micrometers or less, comprising a second birefringent aromatic polymer and at least one cationic dye selected from the group consisting of dye (C), dye (D), dye (E), dye (F), dye (G), dye (H), dye (K), and dye (L), the second birefringent aromatic polymer being aligned along a second alignment direction; and
an intermediate layer between the linear polarizer layer and the optical retarder layer to limit ion diffusion between the linear polarizer layer and the optical retarder layer, wherein an angle between the first alignment direction and the second alignment direction is 40° to 50°.

12. The optical article of claim 11, wherein the optical retarder layer has an in-plane retardation in a range of 110 nm to 175 nm at a wavelength of 550 nm; the in-plane retardation may be in a range of 130 nm to 145 nm at a wavelength of 550 nm.

13. The optical article of claim 11, wherein the optical retarder layer is configured as a quarter-wave retarder.

14. The optical article of claim 11, wherein the first birefringent aromatic polymer and the second birefringent aromatic polymer have identical structure.

15. The optical article of claim 11, wherein the intermediate layer comprises an adhesive.

16. The optical article of claim 11, further comprising a touch sensor layer, the optical retarder layer being positioned between the touch sensor layer and the linear polarizer layer.

17. The optical article of claim 11, further comprising an organic light-emitting diode panel, the optical retarder layer being positioned between the organic light-emitting diode panel and the linear polarizer layer.

* * * * *